United States Patent
Pierce et al.

(10) Patent No.: US 12,014,172 B2
(45) Date of Patent: Jun. 18, 2024

(54) PRESENTATION DESIGN DYNAMIC GENERATION FROM DATA MODEL SERVER

(71) Applicant: Rockwell Automation Technologies, Inc., Mayfield Heights, OH (US)

(72) Inventors: Scott A Pierce, Concord Township, OH (US); Petr Pitrinec, Červený Kostelec (CZ); Roman Vitek, Prague (CZ); Martin Paulicek, Prague (CZ); Michal Hanzeli, Prague (CZ); Eryn Amara Danielle Manela, Cleveland Heights, OH (US); Patrick D Telljohann, Solon, OH (US); Anthony J Diblasio, Independence, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/935,621

(22) Filed: Sep. 27, 2022

(65) Prior Publication Data

US 2024/0103852 A1    Mar. 28, 2024

(51) Int. Cl.
*G05B 19/4155*    (2006.01)
*G05B 19/418*    (2006.01)
(Continued)

(52) U.S. Cl.
CPC .............. *G06F 8/71* (2013.01); *G06F 9/4451* (2013.01)

(58) Field of Classification Search
CPC ... G06F 8/71; G06F 9/441; G06F 8/34; G06F 8/33; G06F 8/20; G06F 9/45558;
(Continued)

(56) References Cited

U.S. PATENT DOCUMENTS 9,148,487 B2    9/2015  Hilburn et al.
10,812,366 B1    10/2020  Berenberg et al.
(Continued)

FOREIGN PATENT DOCUMENTS

EP    2 787 685 A1    10/2014
EP    4 047 432 A1    8/2022

OTHER PUBLICATIONS

Communication Pursuant to Rule 69 EPC received for European Patent Application Serial No. 23187407.4 dated Apr. 8, 2024, 2 pages.
(Continued)

*Primary Examiner* — Thuy Dao
(74) *Attorney, Agent, or Firm* — Amin, Turocy & Watson, LLP

(57) ABSTRACT

An industrial integrated development environment (IDE) can dynamically generate user interfaces for device profiles using predefined reusable profile templates together with data models of the devices for which the device profile interfaces are to be created. The device profile template defines features or components of profile interface views that are reusable across multiple different devices. The industrial IDE determines which interface features defined by the device profile template are required to support the device's data and supported features defined by the data model, and dynamically adapts the device profile template to yield a suitable device profile interface that can be used to view and edit the device's data and configuration parameter values.

20 Claims, 27 Drawing Sheets

(51) Int. Cl.
   *G06F 8/34*     (2018.01)
   *G06F 8/71*     (2018.01)
   *G06F 9/445*    (2018.01)
   *G06F 9/451*    (2018.01)
   *G06F 9/455*    (2018.01)

(58) Field of Classification Search
   CPC .......... G06F 8/65; G06F 11/0709; G06F 8/70;
         G06F 8/60; G05B 19/05; H04L 67/34;
         H04L 41/082
   See application file for complete search history.

(56) References Cited

U.S. PATENT DOCUMENTS

| | | |
   |---|---|---|
   | 11,216,211 B1 | 1/2022 | Miranda et al. |
   | 2004/0019822 A1 | 1/2004 | Knapp, III |
   | 2006/0136497 A1 | 6/2006 | Gikas et al. |
   | 2010/0050097 A1 | 2/2010 | McGreevy et al. |
   | 2014/0164519 A1 | 6/2014 | Shah |
   | 2015/0066162 A1 | 3/2015 | Hokeness et al. |
   | 2019/0324774 A1 | 10/2019 | Coleman et al. |
   | 2019/0325626 A1 | 10/2019 | Tao |
   | 2021/0089278 A1 | 3/2021 | Dunn et al. |
   | 2021/0096553 A1 | 4/2021 | Stump et al. |
   | 2021/0096704 A1 | 4/2021 | Ericsson et al. |
   | 2021/0181720 A1 | 6/2021 | Ratilla et al. |
   | 2022/0413812 A1 | 12/2022 | Chow et al. |
   | 2023/0097099 A1 | 3/2023 | Kothiyal et al. |
   | 2023/0418263 A1* | 12/2023 | Sugimoto ........... G05B 19/0426 |

OTHER PUBLICATIONS

Extended European Search Report received for European Patent Application Serial No. 23187241.7 dated Feb. 2, 2024, 9 pages.
   Extended European Search Report received for European Patent Application Serial No. 23187405.8 dated Feb. 1, 2024, 9 pages.
   Extended European Search Report received for European Patent Application Serial No. 23187234.2 dated Feb. 14, 2024, 9 pages.
   Extended European Search Report received for European Patent Application Serial No. 23187407.4 dated Feb. 13, 2024, 9 pages.
   Communication Pursuant to Rule 69 EPC received for European Patent Application Serial No. 23187241.7 dated Mar. 18, 2024, 2 pages.
   Communication Pursuant to Rule 69 EPC received for European Patent Application Serial No. 23187405.8 dated Apr. 8, 2024, 2 pages.
   Communication Pursuant to Rule 69 EPC received for European Patent Application Serial No. 23187234.2 dated Apr. 8, 2024, 2 pages.
   Non Final Office Action received for U.S. Appl. No. 17/935,606 dated Apr. 10, 2024, 35 pages.
   Notice of allowance received for U.S. Appl. No. 17/930,789 dated Apr. 18, 2024, 30 pages.
   Ranefors, Integrated Development Environment for User Interface Development and Customization for Mobile Platforms (Year: 2007).
   Faraj et al. An industry foundation classes Web-based collaborative construction computer environment: WISPER (Year: 2000).
   Zhao et al., EasyView: Bringing Performance Profiles into Integrated Development Environments (Year: 2023).

* cited by examiner

INDUSTRIAL ASSET

PRESENTATION DESIGN DYNAMIC GENERATION FROM DATA MODEL SERVER

TECHNICAL FIELD

The subject matter disclosed herein relates generally to industrial automation systems, and, for example, to industrial programming development platforms.

BACKGROUND ART

Industrial device parameters are often configured using specialized device configuration software, which allows a controls engineer to set values of these parameters to suit the requirements of an industrial control application.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system is provided, comprising a user interface component configured to: render, on a client device, a development interface of an industrial integrated development environment (IDE) system, and display, on the development interface, design information relating to an industrial control project of an industrial automation system, the design information comprising at least device profiles representing physical industrial devices included in the industrial automation system; and a device profile generation component configured to, in response to selection, via interaction with the development interface, of a device profile corresponding to an industrial device: select a device profile template to be used as a basis for rendering a profile interface for the device profile, wherein the device profile template defines presentation features of the profile interface, identify a first subset of the presentation features defined by the device profile template that correspond to features of the industrial device defined in a device data model, and generate, on the development interface, the profile interface to include the first subset of the presentation features and to omit a second subset of the presentation features that do not correspond to the features of the industrial device defined in the device data model.

Also, one or more embodiments provide a method, comprising rendering, by an industrial integrated development environment (IDE) system comprising a processor, a development interface on a client device; displaying, by the industrial IDE system on the development interface, design information relating to an industrial control project of an industrial automation system, the design information comprising at least device profiles representing physical industrial devices included in the industrial automation system; and in response to receiving a selection, via interaction with the development interface, of a device profile corresponding to an industrial device: selecting, by the industrial IDE system, a device profile template to be used as a basis for rendering a profile interface for the device profile, wherein the device profile template defines presentation features of the profile interface, identifying, by the industrial IDE system, a first subset of the presentation features defined by the device profile template that correspond to features of the industrial device defined in a device data model, and generating, by the industrial IDE system, the profile interface on the development interface, wherein the generating comprises rendering, on the profile interface, the first subset of the presentation features and omitting, from the profile interface, a second subset of the presentation features that do not correspond to the features of the industrial device defined in the device data model.

Also, according to one or more embodiments, a non-transitory computer-readable medium is provided having stored thereon instructions that, in response to execution, cause an industrial integrated development environment (IDE) system to perform operations, the operations comprising displaying a development interface on a client device; displaying, on the development interface, an industrial control project developed for an industrial automation system, the industrial control project comprising at least device profiles representing industrial devices included in the industrial automation system; and in response to receiving a selection, via interaction with the development interface, of a device profile corresponding to an industrial device: selecting a device profile template to be used for rendering a profile interface for the device profile, wherein the device profile template defines user interface features of the profile interface, referencing a device data model that defines data items and features supported by the industrial device, identifying a first subset of the user interface features defined by the device profile template that correspond to the data items and features defined in the device data model, and displaying the profile interface on the development interface, wherein the displaying comprises displaying, on the profile interface, the first subset of the presentation features and omitting, from the profile interface, a second subset of the presentation features that do not correspond to the data items and features defined in the device data model.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
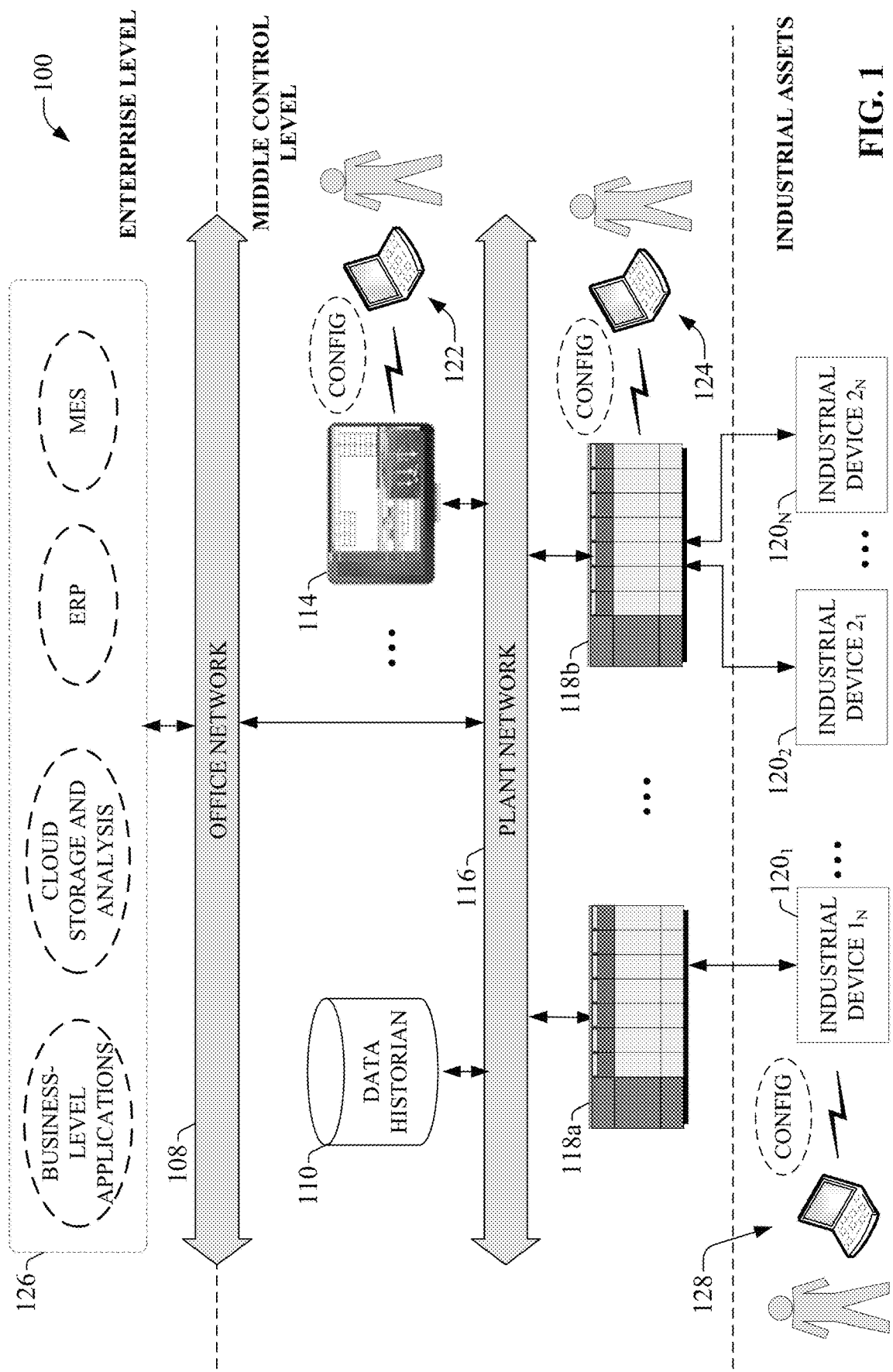
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or systems (e.g., industrial machines). One or more industrial controllers 118 may also comprise a soft controller executed on a personal computer or other hardware platform, or on a cloud platform. Some hybrid devices may also combine controller functionality with other functions (e.g., visualization). The control programs executed by industrial controllers 118 can comprise substantially any type of code capable of processing input signals read from the industrial devices 120 and controlling output signals generated by the industrial controllers 118, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, pumps, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by their associated control programs and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed location or mobile devices with either user-installed or pre-installed operating systems, and either user-installed or pre-installed graphical application software.

Some industrial environments may also include other systems or devices relating to specific aspects of the controlled industrial systems. These may include, for example, a data historian 110 that aggregates and stores production information collected from the industrial controllers 118 or other data sources, device documentation stores containing electronic documentation for the various industrial devices making up the controlled industrial systems, inventory tracking systems, work order management systems, repositories for machine or process drawings and documentation, vendor product documentation storage, vendor knowledgebases, internal knowledgebases, work scheduling applications, or other such systems, some or all of which may reside on an office network 108 of the industrial environment.

Higher-level systems 126 may carry out functions that are less directly related to control of the industrial automation systems on the plant floor, and instead are directed to long term planning, high-level supervisory control, analytics, reporting, or other such high-level functions. These systems 126 may reside on the office network 108 at an external location relative to the plant facility, or on a cloud platform with access to the office and/or plant networks. Higher-level systems 126 may include, but are not limited to, cloud storage and analysis systems, big data analysis systems, manufacturing execution systems, data lakes, reporting systems, etc. In some scenarios, applications running at these higher levels of the enterprise may be configured to analyze control system operational data, and the results of this analysis may be fed back to an operator at the control system or directly to a controller 118 or device 120 in the control system.

The various control, monitoring, and analytical devices that make up an industrial environment must be programmed or configured using respective configuration applications specific to each device. For example, industrial controllers 118 are typically configured and programmed using a control programming development application such as a ladder logic editor (e.g., executing on a client device 124). Using such development platforms, a designer can write control programming (e.g., ladder logic, structured text, function block diagrams, etc.) for carrying out a desired industrial sequence or process and download the resulting program files to the controller 118. Separately, developers design visualization screens and associated navigation structures for HMIs 114 using an HMI development platform (e.g., executing on client device 122) and download the resulting visualization files to the HMI 114. Some industrial devices 120—such as motor drives, telemetry devices, safety input devices, etc. —may also require configuration using separate device configuration tools (e.g., executing on client device 128) that are specific to the device being configured. Such device configuration tools may be used to set device parameters or operating modes (e.g., high/low limits, output signal formats, scale factors, energy consumption modes, etc.).

The necessity of using separate configuration tools to program and configure disparate aspects of an industrial automation system results in a piecemeal design approach whereby different but related or overlapping aspects of an automation system are designed, configured, and programmed separately on different development environments. For example, a motion control system may require an industrial controller to be programmed and a control loop to be tuned using a control logic programming platform, a motor drive to be configured using another configuration platform, and an associated HMI to be programmed using a visualization development platform. Related peripheral systems—such as vision systems, safety systems, etc. —may also require configuration using separate programming or development applications.

This segregated development approach can also necessitate considerable testing and debugging efforts to ensure proper integration of the separately configured system aspects. In this regard, intended data interfacing or coordinated actions between the different system aspects may require significant debugging due to a failure to properly coordinate disparate programming efforts.

To address at least some of these or other issues, one or more embodiments described herein provide an integrated development environment (IDE) for designing, programming, and configuring multiple aspects of an industrial automation system using a common design environment and data model. Embodiments of the industrial IDE can be used to configure and manage automation system devices in a common way, facilitating integrated, multi-discipline programming of control, visualization, and other aspects of the control system.

In general, the industrial IDE supports features that span the full automation lifecycle, including design (e.g., device selection and sizing, controller programming, visualization development, device configuration, testing, etc.); installation, configuration and commissioning; operation, improvement, and administration; and troubleshooting, expanding, and upgrading.

Embodiments of the industrial IDE can include a library of modular code and visualizations that are specific to industry verticals and common industrial applications within those verticals. These code and visualization modules can simplify development and shorten the development cycle, while also supporting consistency and reuse across an industrial enterprise.

To support enhance development capabilities, projects creating using embodiments of the IDE system can be built on an object-based model rather than, or in addition to, a tag-based architecture. To this end, the IDE system can support the use of automation objects that serve as building blocks for this object-based development structure. To ensure consistency within and between projects, as well as to ensure that a given industrial project is dynamically updated to reflect changes to an industrial asset's attributes (e.g., control code, visualization definitions, testing scripts, analytic code, etc.), embodiments of the IDE system can use automation object inheritance features to propagate changes made to an automation object definition to all instances of the automation object used throughout a control project.

Figure 2:
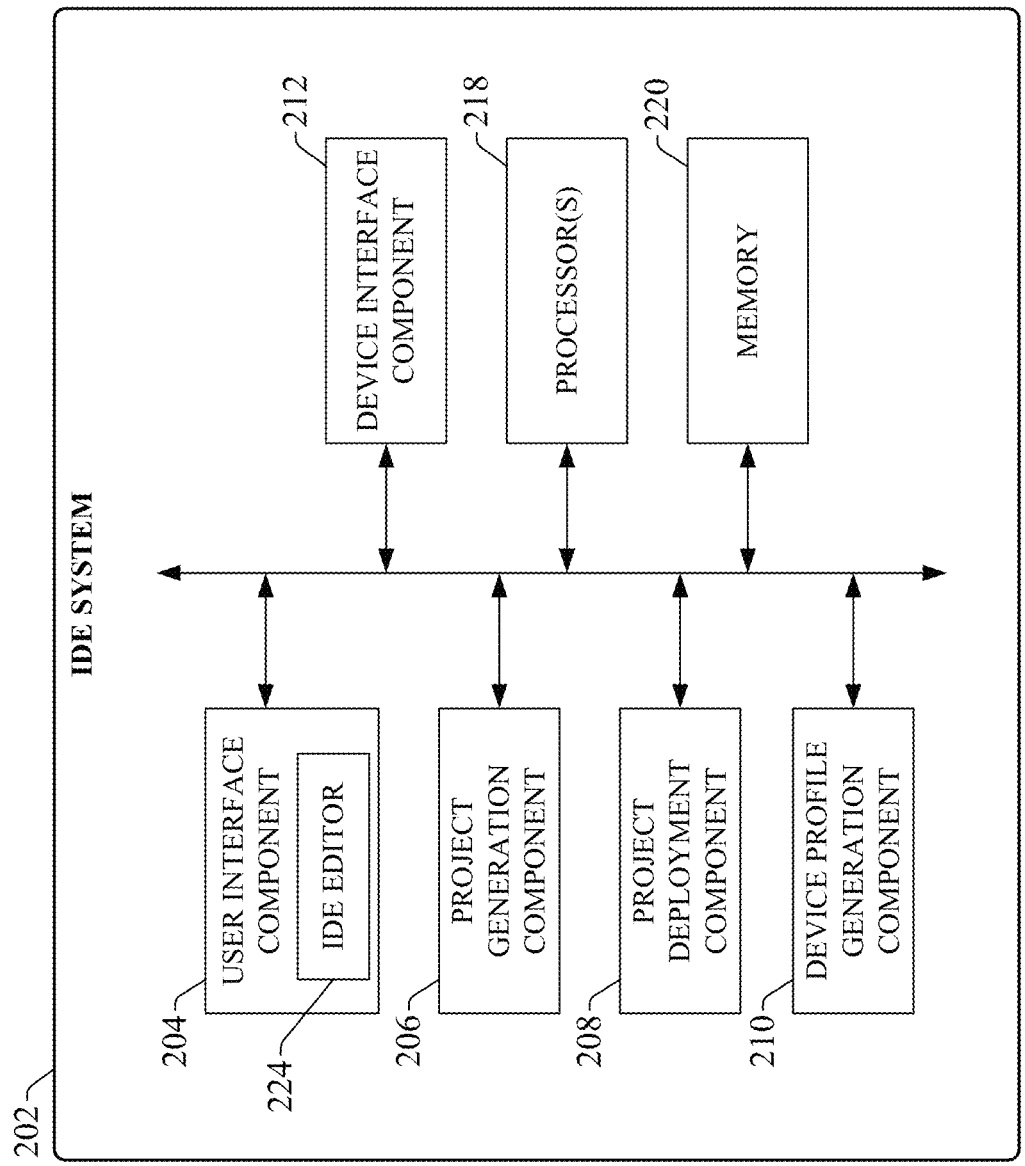
FIG. 2 is a block diagram of an example integrated development environment (IDE) system.

Additionally, some embodiments of the industrial IDE system can include device profile creation tools that extend the IDE system's capabilities by allowing users, including IDE developers, to create device profiles using an IDE-type development interface. These tools allow device vendors or end users to easily create device profiles that can be stored in a device profile library and added to automation projects as needed. Device profiles created in this manner can be used to set device configurations or parameter values for corresponding devices—e.g., controller modules, motor drives, smart devices, etc. —within the system project. To simplify development of device profiles and to minimize duplication of code for different device profile views, the device profile development environment allows developers to bind a single device profile presentation design to multiple different backend services at runtime, allowing the same device profile code to be used for multiple different devices. The device profile development environment can also allow developers to define different device bindings for a single device profile presentation using a text-based configuration file, thereby providing a simple technique for binding selected device input parameters of various industrial devices to specified form fields of the device profile view. In some embodiments, FIG. 2 is a block diagram of an example integrated development environment (IDE) system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

IDE system 202 can include a user interface component 204 including an IDE editor 224, a project generation component 206, a project deployment component 208, a device profile generation component 210, a device interface component 212, one or more processors 218, and memory 220. In various embodiments, one or more of the user interface component 204, project generation component 206, project deployment component 208, device profile generation component 210, device interface component 212 the one or more processors 218, and memory 220 can be electrically and/or communicatively coupled to one another to perform one or more of the functions of the IDE system 202. In some embodiments, components 204, 206, 208, 210, and 212 can comprise software instructions stored on memory 220 and executed by processor(s) 218. IDE system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to communicatively interface with an IDE client that executes on a client device (e.g., a laptop computer, tablet computer, smart phone, etc.) that is communicatively connected to the IDE system 202 (e.g., via a hardwired or wireless connection). The user interface component 204 can then receive user input data and render output data via the IDE client. In other embodiments, user interface component 314 can be configured to generate and serve suitable interface screens to a client device (e.g., program development screens), and exchange data via these interface screens. Input data that can be received via various embodiments of user interface component 204 can include, but is not limited to, programming code, industrial design specifications or goals, engineering drawings, AR/VR input, DSL definitions, video or image data, device configuration data, device profile definition data, or other such input. Output data rendered by various embodiments of user interface component 204 can include program code, programming feedback (e.g., error and highlighting, coding suggestions, etc.), programming and visualization development screens, project testing results, etc.

Project generation component 206 can be configured to create a system project comprising one or more project files based on design input received via the user interface component 204, as well as industrial knowledge, predefined code modules and visualizations, and automation objects 222 maintained by the IDE system 202. Project deployment component 208 can be configured to commission the system project created by the project generation component 206 to appropriate industrial devices (e.g., controllers, HMI terminals, motor drives, AR/VR systems, etc.) for execution. To this end, project deployment component 208 can identify the appropriate target devices to which respective portions of the system project should be sent for execution, translate these respective portions to formats understandable by the target devices, and deploy the translated project components to their corresponding devices.

Device profile generation component 210 can be configured to generate a reusable device profile corresponding to a type of industrial device, asset, or system. The device profile can define configuration parameters for the corresponding industrial device, as defined by an authorized user of the IDE system 202. The device profile generation component 210 can generate the device profile based on profile definition data submitted by the user via a graphical profile definition interface rendered by the user interface component 204.

Device interface component 212 can be configured to remotely connect to physical industrial devices corresponding to device profile instances, and to manage exchange of data between the physical device and the client device. This can include obtaining runtime data from the device and rendering (via the user interface component 204) this data on an instance of the device profile displayed on the client device, as well as writing device configuration updates that are submitted via the device profile instance to the device.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
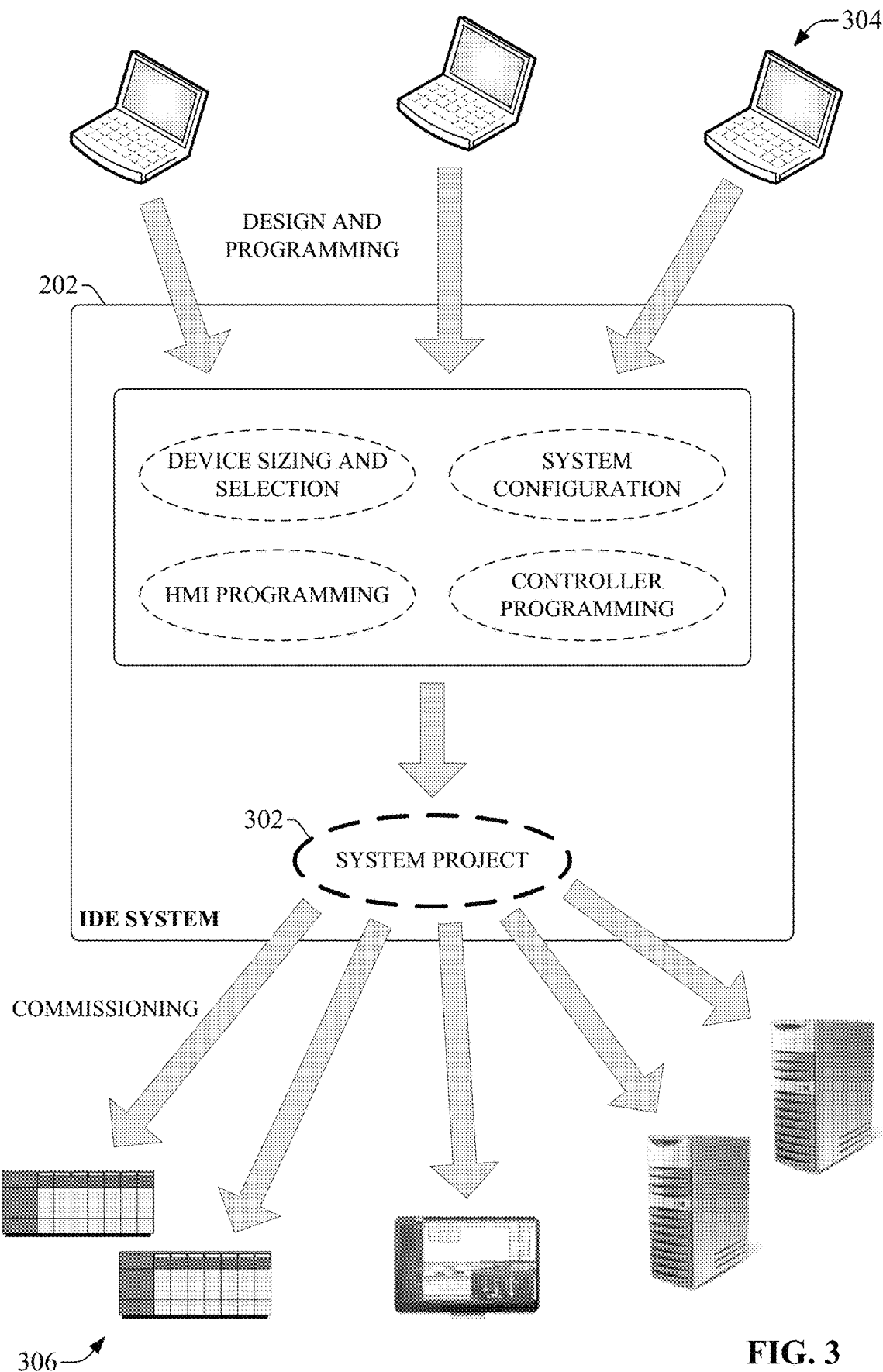
FIG. 3 is a diagram illustrating a generalized architecture of an industrial IDE system.

FIG. 3 is a diagram illustrating a generalized architecture of the industrial IDE system 202 according to one or more embodiments. Industrial IDE system 202 can implement a common set of services and workflows spanning not only design, but also commissioning, operation, and maintenance. In terms of design, the IDE system 202 can support not only industrial controller programming and HMI development, but also sizing and selection of system components, device/system configuration, AR/VR visualizations, and other features. The IDE system 202 can also include tools that simplify and automate commissioning of the resulting project and assist with subsequent administration of the deployed system during runtime.

Embodiments of the IDE system 202 that are implemented on a cloud platform also facilitate collaborative project development whereby multiple developers 304 contribute design and programming input to a common automation system project 302. Collaborative tools supported by the IDE system can manage design contributions from the multiple contributors and perform version control of the aggregate system project 302 to ensure project consistency.

Based on design and programming input from one or more developers 304, IDE system 202 generates a system project 302 comprising one or more project files. The system project 302 encodes one or more of control programming; HMI, AR, and/or VR visualizations; device or sub-system configuration data (e.g., drive parameters, vision system configurations, telemetry device parameters, safety zone definitions, etc.); or other such aspects of an industrial automation system being designed. IDE system 202 can identify the appropriate target devices 306 on which respective aspects of the system project 302 should be executed (e.g., industrial controllers, HMI terminals, variable frequency drives, safety devices, etc.), translate the system project 302 to executable files that can be executed on the respective target devices, and deploy the executable files to their corresponding target devices 306 for execution, thereby commissioning the system project 302 to the plant floor for implementation of the automation project.

Figure 4:
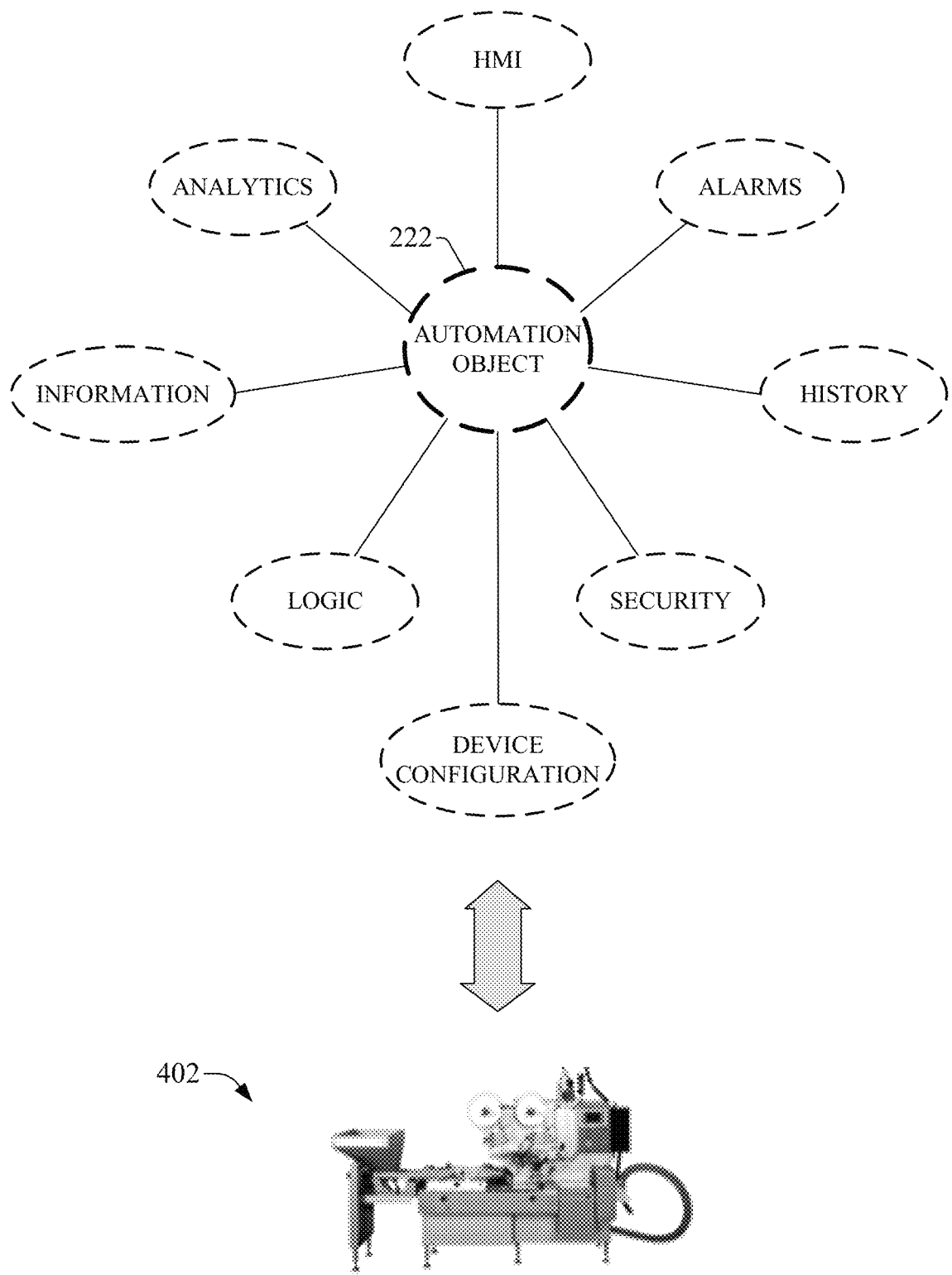
FIG. 4 is a diagram illustrating several example automation object properties that can be leveraged by an industrial IDE system in connection with building, deploying, and executing a system project.

To support enhanced development capabilities, some embodiments of IDE system 202 can be built on an object-based data model rather than, or in addition to, a tag-based architecture. Automation objects 222 serve as the building block for this object-based development architecture. FIG. 4 is a diagram illustrating several example automation object properties that can be leveraged by the IDE system 202 in connection with building, deploying, and executing a system project 302. Automation objects 222 can be created and augmented during design, integrated into larger data models, and consumed during runtime. These automation objects 222 provide a common data structure across the IDE system 202 and can be stored in an object library (e.g., part of memory 220) for reuse. The object library can store pre-defined automation objects 222 representing various classifications of real-world industrial assets 402, including but not limited to pumps, tanks, values, motors, motor drives (e.g., variable frequency drives), industrial robots, actuators (e.g., pneumatic or hydraulic actuators), or other such assets. Automation objects 222 can represent elements at substantially any level of an industrial enterprise, including individual devices, machines made up of many industrial devices and components (some of which may be associated with their own automation objects 222), and entire production lines or process control systems.

An automation object 222 for a given type of industrial asset can encode such aspects as 2D or 3D visualizations, alarms, control coding (e.g., logic or other type of control programming), analytics, startup procedures, testing protocols and scripts, validation reports, simulations, schematics, security protocols, and other such properties associated with the industrial asset 402 represented by the object 222. As will be described in more detail herein, an automation object 222 can also store device configuration settings for an industrial device as a sequence of mouse and keystroke interactions with a device profile configuration interface, such that these interactions can be played back to facilitate reproducing the device configuration for another device. Automation objects 222 can also be geotagged with location information identifying the location of the associated asset. During runtime of the system project 302, the automation object 222 corresponding to a given real-world asset 402 can also record status or operational history data for the asset. In general, automation objects 222 serve as programmatic representations of their corresponding industrial assets 402, and can be incorporated into a system project 302 as elements of control code, a 2D or 3D visualization, a knowledgebase or maintenance guidance system for the industrial assets, or other such aspects.

Figure 5:
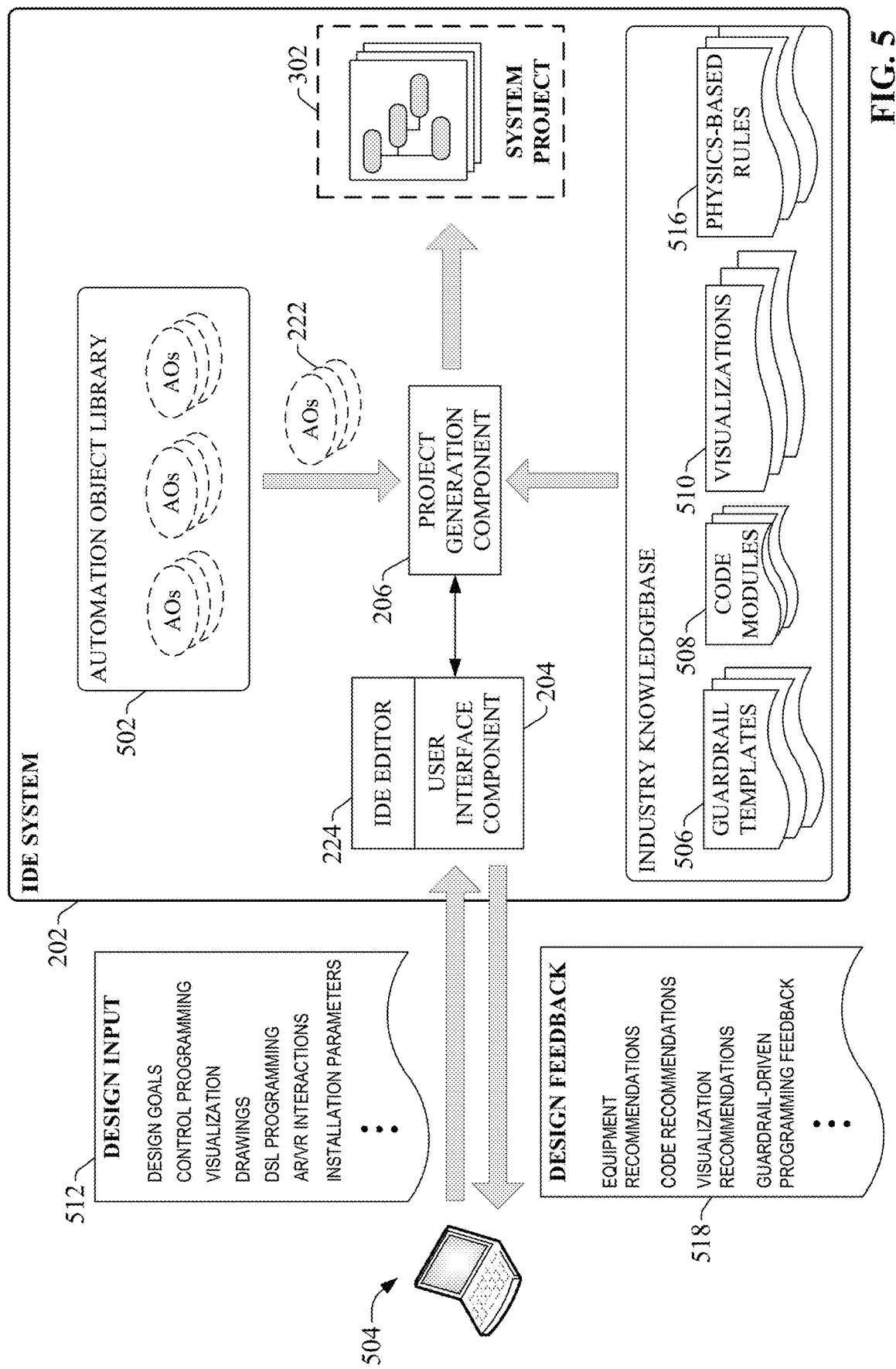
FIG. 5 is a diagram illustrating example data flows associated with creation of a system project for an automation system being designed using and industrial IDE system.

FIG. 5 is a diagram illustrating example data flows associated with creation of a system project 302 for an automation system being designed using IDE system 202 according to one or more embodiments. A client device 504 (e.g., a laptop computer, tablet computer, desktop computer, mobile device, wearable AR/VR appliance, etc.) can access the IDE system's project development tools and leverage these tools to create a comprehensive system project 302 for an automation system being developed. Through interaction with the system's user interface component 204, developers can submit design input 512 to the IDE system 202 in various supported formats, including industry-specific control programming (e.g., control logic, structured text, sequential function charts, etc.) and HMI screen configuration input. Based on this design input 512 and information stored in an industry knowledgebase (predefined code modules 508 and visualizations 510, guardrail templates 506, physics-based rules 516, etc.), user interface component 204 renders design feedback 518 designed to assist the developer in connection with developing a system project 302 for configuration, control, and visualization of an industrial automation system.

In addition to control programming and visualization definitions, some embodiments of IDE system 202 can be configured to receive digital engineering drawings (e.g., computer-aided design (CAD) files) as design input 512. In such embodiments, project generation component 206 can generate portions of the system project 302—e.g., by automatically generating control and/or visualization code—based on analysis of existing design drawings. Drawings that can be submitted as design input 512 can include, but are not limited to, P&ID drawings, mechanical drawings, flow diagrams, or other such documents. For example, a P&ID drawing can be imported into the IDE system 202, and project generation component 206 can identify elements (e.g., tanks, pumps, etc.) and relationships therebetween conveyed by the drawings. Project generation component 206 can associate or map elements identified in the drawings with appropriate automation objects 222 corresponding to these elements (e.g., tanks, pumps, etc.) and add these automation objects 222 to the system project 302. The device-specific and asset-specific automation objects 222 include suitable code and visualizations to be associated with the elements identified in the drawings. In general, the IDE system 202 can examine one or more different types of drawings (mechanical, electrical, piping, etc.) to determine relationships between devices, machines, and/or assets (including identifying common elements across different drawings) and intelligently associate these elements with appropriate automation objects 222, code modules 508, and/or visualizations 510. The IDE system 202 can leverage physics-based rules 516 as well as pre-defined code modules 508 and visualizations 510 as necessary in connection with generating code or project data for system project 302.

The IDE system 202 can also determine whether pre-defined visualization content is available for any of the objects discovered in the drawings and generate appropriate HMI screens or AR/VR content for the discovered objects based on these pre-defined visualizations. To this end, the IDE system 202 can store industry-specific, asset-specific, and/or application-specific visualizations 510 that can be accessed by the project generation component 206 as needed. These visualizations 510 can be classified according to industry or industrial vertical (e.g., automotive, food and drug, oil and gas, pharmaceutical, etc.), type of industrial asset (e.g., a type of machine or industrial device), a type of industrial application (e.g., batch processing, flow control, web tension control, sheet metal stamping, water treatment, etc.), or other such categories. Predefined visualizations 510 can comprise visualizations in a variety of formats, including but not limited to HMI screens or windows, mashups that aggregate data from multiple pre-specified sources, AR overlays, VR objects representing 3D virtualizations of the associated industrial asset, or other such visualization formats. IDE system 202 can select a suitable visualization for a given object based on a predefined association between the object type and the visualization content.

Also, or in addition, some embodiments of IDE system 202 can support goal-based automated programming. For example, the user interface component 204 can allow the user to specify production goals for an automation system being designed (e.g., specifying that a bottling plant being designed must be capable of producing at least 5000 bottles per second during normal operation) and any other relevant design constraints applied to the design project (e.g., budget limitations, available floor space, available control cabinet space, etc.). Based on this information, the project generation component 206 will generate portions of the system project 302 to satisfy the specified design goals and constraints. Portions of the system project 302 that can be generated in this manner can include, but are not limited to, device and equipment selections (e.g., definitions of how many pumps, controllers, stations, conveyors, drives, or other assets will be needed to satisfy the specified goal), associated device configurations (e.g., tuning parameters, network settings, drive parameters, etc.), control coding, or HMI screens suitable for visualizing the automation system being designed.

Some embodiments of the project generation component 206 can also generate at least some of the project code for system project 302 based on knowledge of parts that have been ordered for the project being developed. This can involve accessing the customer's account information maintained by an equipment vendor to identify devices that have been purchased for the project. Based on this information the project generation component 206 can add appropriate automation objects 222 and associated code modules 508 corresponding to the purchased assets, thereby providing a starting point for project development.

Some embodiments of project generation component 206 can also monitor customer-specific design approaches for commonly programmed functions (e.g., pumping applications, batch processes, palletizing operations, etc.) and generate recommendations for design modules (e.g., code modules 508, visualizations 510, etc.) that the user may wish to incorporate into a current design project based on an inference of the designer's goals and learned approaches to achieving the goal. To this end, some embodiments of project generation component 206 can be configured to monitor design input 512 over time and, based on this monitoring, learn correlations between certain design actions (e.g., addition of certain code modules or snippets to design projects, selection of certain visualizations, etc.) and types of industrial assets, industrial sequences, or industrial processes being designed. Project generation component 206 can record these learned correlations and generate recommendations during subsequent project development sessions based on these correlations. For example, if project generation component 206 determines, based on analysis of design input 512, that a designer is currently developing a control project involving a type of industrial equipment that has been programmed and/or visualized in the past in a repeated, predictable manner, the project generation component 206 can instruct user interface component 204 to render recommended development steps or code modules 508 the designer may wish to incorporate into the system project 302 based on how this equipment was configured and/or programmed in the past.

In some embodiments, IDE system 202 can also store and implement guardrail templates 506 that define design guardrails intended to ensure the project's compliance with internal or external design standards. Based on design parameters defined by one or more selected guardrail templates 506, user interface component 204 can provide, as a subset of design feedback 518, dynamic recommendations or other types of feedback designed to guide the developer in a manner that ensures compliance of the system project 302 with internal or external requirements or standards (e.g., certifications such as TUV certification, in-house design standards, industry-specific or vertical-specific design standards, etc.). This feedback 518 can take the form of text-based recommendations (e.g., recommendations to rewrite an indicated portion of control code to comply with a defined programming standard), syntax highlighting, error highlighting, auto-completion of code snippets, or other such formats. In this way, IDE system 202 can customize design feedback 518—including programming recommendations, recommendations of predefined code modules 508 or visualizations 510, error and syntax highlighting, etc. —in accordance with the type of industrial system being developed and any applicable in-house design standards.

Guardrail templates 506 can also be designed to maintain compliance with global best practices applicable to control programming or other aspects of project development. For example, user interface component 204 may generate and render an alert if a developer's control programming is deemed to be too complex as defined by criteria specified by one or more guardrail templates 506. Since different verticals (e.g., automotive, pharmaceutical, oil and gas, food and drug, marine, etc.) must adhere to different standards and certifications, the IDE system 202 can maintain a library of guardrail templates 506 for different internal and external standards and certifications, including customized user-specific guardrail templates 506. These guardrail templates 506 can be classified according to industrial vertical, type of industrial application, plant facility (in the case of custom in-house guardrail templates 506) or other such categories. During development, project generation component 206 can select and apply a subset of guardrail templates 506 determined to be relevant to the project currently being developed, based on a determination of such aspects as the industrial vertical to which the project relates, the type of industrial application being programmed (e.g., flow control, web tension control, a certain batch process, etc.), or other such aspects. Project generation component 206 can leverage guardrail templates 506 to implement rules-based programming, whereby programming feedback (a subset of design feedback 518) such as dynamic intelligent autocorrection, type-aheads, or coding suggestions are rendered based on encoded industry expertise and best practices (e.g., identifying inefficiencies in code being developed and recommending appropriate corrections).

Users can also run their own internal guardrail templates 506 against code provided by outside vendors (e.g., OEMs) to ensure that this code complies with in-house programming standards. In such scenarios, vendor-provided code can be submitted to the IDE system 202, and project generation component 206 can analyze this code in view of in-house coding standards specified by one or more custom guardrail templates 506. Based on results of this analysis, user interface component 204 can indicate portions of the vendor-provided code (e.g., using highlights, overlaid text, etc.) that do not conform to the programming standards set forth by the guardrail templates 506, and display suggestions for modifying the code in order to bring the code into compliance. As an alternative or in addition to recommending these modifications, some embodiments of project generation component 206 can be configured to automatically modify the code in accordance with the recommendations to bring the code into conformance.

In making coding suggestions as part of design feedback 518, project generation component 206 can invoke selected code modules 508 stored in a code module database or selected automation objects 222 stored in an automation object library 502 (e.g., on memory 220). Code modules 508 comprise standardized coding segments for controlling common industrial tasks or applications (e.g., palletizing, flow control, web tension control, pick-and-place applications, conveyor control, etc.). Similarly, automation objects 222 representing respective industrial assets may have associated therewith standardize control code for monitoring and controlling their respective assets. In some embodiments, code modules 508 and/or automation objects 222 can be categorized according to one or more of an industrial vertical (e.g., automotive, food and drug, oil and gas, textiles, marine, pharmaceutical, etc.), an industrial application, or a type of machine or device to which the code module 508 or automation object 222 is applicable.

In some embodiments, project generation component 206 can infer a programmer's current programming task or design goal based on programmatic input being provided by the programmer (as a subset of design input 512), and determine, based on this task or goal, whether one of the pre-defined code modules 508 or automation objects 222 may be appropriately added to the control program being developed to achieve the inferred task or goal. For example, project generation component 206 may infer, based on analysis of design input 512, that the programmer is currently developing control code for transferring material from a first tank to another tank, and in response, recommend inclusion of a predefined code module 508 comprising standardized or frequently utilized code for controlling the valves, pumps, or other assets necessary to achieve the material transfer. Similarly, the project generation component 206 may recommend inclusion of an automation object 222 representing one of the tanks, or one of the other industrial assets involved in transferring the material (e.g., a valve, a pump, etc.), where the recommended automation object 222 includes associated control code for controlling its associated asset as well as a visualization object that can be used to visualize the asset on an HMI application or another visualization application.

Customized guardrail templates 506 can also be defined to capture nuances of a customer site that should be taken into consideration in the project design. For example, a guardrail template 506 could record the fact that the automation system being designed will be installed in a region where power outages are common, and will factor this consideration when generating design feedback 518; e.g., by recommending implementation of backup uninterruptable power supplies and suggesting how these should be incorporated, as well as recommending associated programming or control strategies that take these outages into account.

IDE system 202 can also use guardrail templates 506 to guide user selection of equipment or devices for a given design goal; e.g., based on the industrial vertical, type of control application (e.g., sheet metal stamping, die casting, palletization, conveyor control, web tension control, batch processing, etc.), budgetary constraints for the project, physical constraints at the installation site (e.g., available floor, wall or cabinet space; dimensions of the installation space; etc.), equipment already existing at the site, etc. Some or all of these parameters and constraints can be provided as design input 512, and user interface component 204 can render the equipment recommendations as a subset of design feedback 518. In conjunction with this equipment recommendation, the project generation component 206 can also recommend inclusion of corresponding automation objects 222 representing the recommended equipment for inclusion in the system project 302.

In some embodiments, project generation component 206 can also determine whether some or all existing equipment can be repurposed for the new control system being designed. For example, if a new bottling line is to be added to a production area, there may be an opportunity to leverage existing equipment since some bottling lines already exist. The decision as to which devices and equipment can be reused will affect the design of the new control system. Accordingly, some of the design input 512 provided to the IDE system 202 can include specifics of the customer's existing systems within or near the installation site. In some embodiments, project generation component 206 can apply artificial intelligence (AI) or traditional analytic approaches to this information to determine whether existing equipment specified in design in put 512 can be repurposed or leveraged. Based on results of this analysis, project generation component 206 can generate, as design feedback 518, a list of any new equipment that may need to be purchased based on these decisions.

In some embodiments, IDE system 202 can offer design recommendations based on an understanding of the physical environment within which the automation system being designed will be installed. To this end, information regarding the physical environment can be submitted to the IDE system 202 (as part of design input 512) in the form of 2D or 3D images or video of the plant environment. This environmental information can also be obtained from an existing digital twin of the plant, or by analysis of scanned environmental data obtained by a wearable AR appliance in some embodiments. Project generation component 206 can analyze this image, video, or digital twin data to identify physical elements within the installation area (e.g., walls, girders, safety fences, existing machines and devices, etc.) and physical relationships between these elements. This can include ascertaining distances between machines, lengths of piping runs, locations and distances of wiring harnesses or cable trays, etc. Based on results of this analysis, project generation component 206 can add context to schematics generated as part of system project 302, generate recommendations regarding optimal locations for devices or machines (e.g., recommending a minimum separation between power and data cables), or make other refinements to the system project 302. At least some of this design data can be generated based on physics-based rules 516, which can be referenced by project generation component 206 to determine such physical design specifications as minimum safe distances from hazardous equipment (which may also factor into determining suitable locations for installation of safety devices relative to this equipment, given expected human or vehicle reaction times defined by the physics-based rules 516), material selections capable of withstanding expected loads, piping configurations and tuning for a specified flow control application, wiring gauges suitable for an expected electrical load, minimum distances between signal wiring and electromagnetic field (EMF) sources to ensure negligible electrical interference on data signals, or other such design features that are dependent on physical rules.

In an example use case, relative locations of machines and devices specified by physical environment information submitted to the IDE system 202 can be used by the project generation component 206 to generate design data for an industrial safety system. For example, project generation component 206 can analyze distance measurements between safety equipment and hazardous machines and, based on these measurements, determine suitable placements and configurations of safety devices and associated safety controllers that ensure the machine will shut down within a sufficient safety reaction time to prevent injury (e.g., in the event that a person runs through a light curtain).

Figure 6:
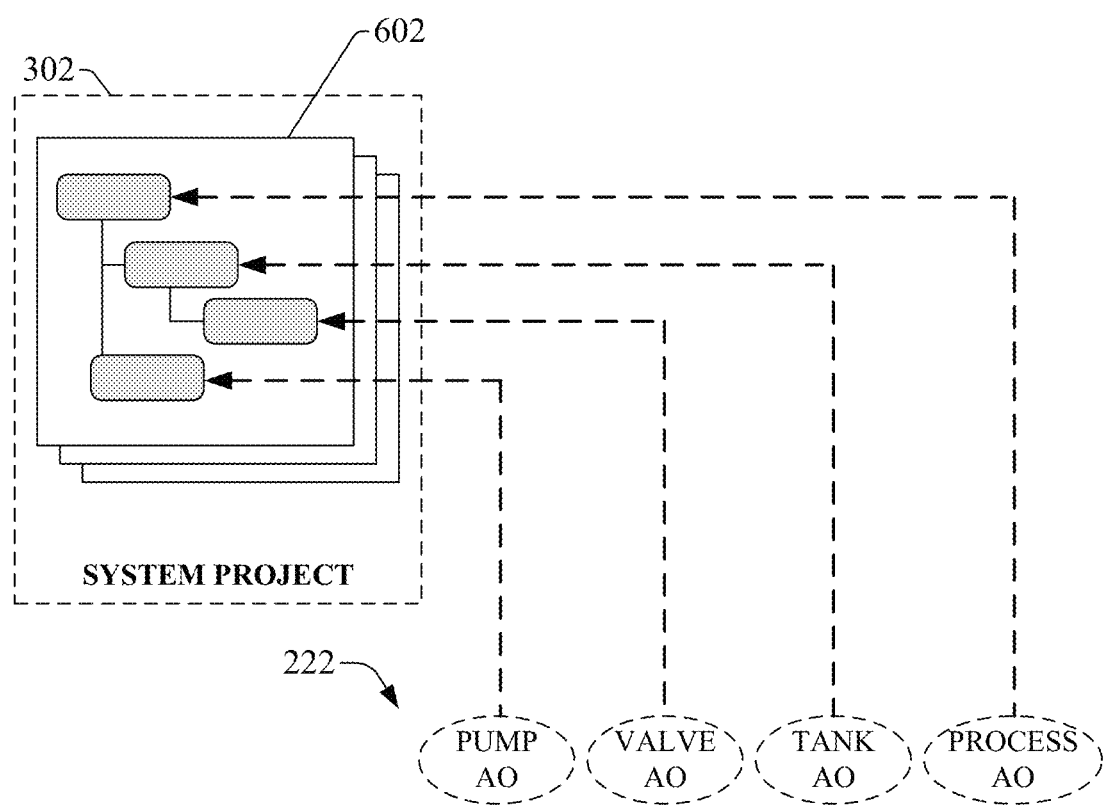
FIG. 6 is a diagram illustrating an example system project that incorporates automation objects into a project model.

As noted above, the system project 302 generated by IDE system 202 for a given automaton system being designed can be built upon an object-based architecture that uses automation objects 222 as building blocks. FIG. 6 is a diagram illustrating an example system project 302 that incorporates automation objects 222 into the project model. In this example, various automation objects 222 representing analogous industrial devices, systems, or assets of an automation system (e.g., a process, tanks, valves, pumps, etc.) have been incorporated into system project 302 as elements of a larger project data model 602. The project data model 602 also defines hierarchical relationships between these automation objects 222. According to an example relationship, a process automation object representing a batch process may be defined as a parent object to a number of child objects representing devices and equipment that carry out the process, such as tanks, pumps, and valves. Each automation object 222 has associated therewith object properties or attributes specific to its corresponding industrial asset (e.g., those discussed above in connection with FIG. 4), including executable control programming for controlling the asset (or for coordinating the actions of the asset with other industrial assets) and visualizations that can be used to render relevant information about the asset during runtime.

At least some of the attributes of each automation object 222 are default properties defined by the IDE system 202 based on encoded industry expertise pertaining to the asset represented by the objects. These default properties can include, for example, industry-standard or recommended control code for monitoring and controlling the asset represented by the automation object 222, a 2D or 3D graphical object that can be used to visualize operational or statistical data for the asset, alarm conditions associated with the asset, analytic or reporting scripts designed to yield actionable insights into the asset's behavior, or other such properties. Other properties can be modified or added by the developer as needed (via design input 512) to customize the automation object 222 for the particular asset and/or industrial application for which the system projects 302 is being developed. This can include, for example, associating customized control code, HMI screens, AR presentations, or help files associated with selected automation objects 222. In this way, automation objects 222 can be created and augmented as needed during design for consumption or execution by target control devices during runtime.

Figure 7:
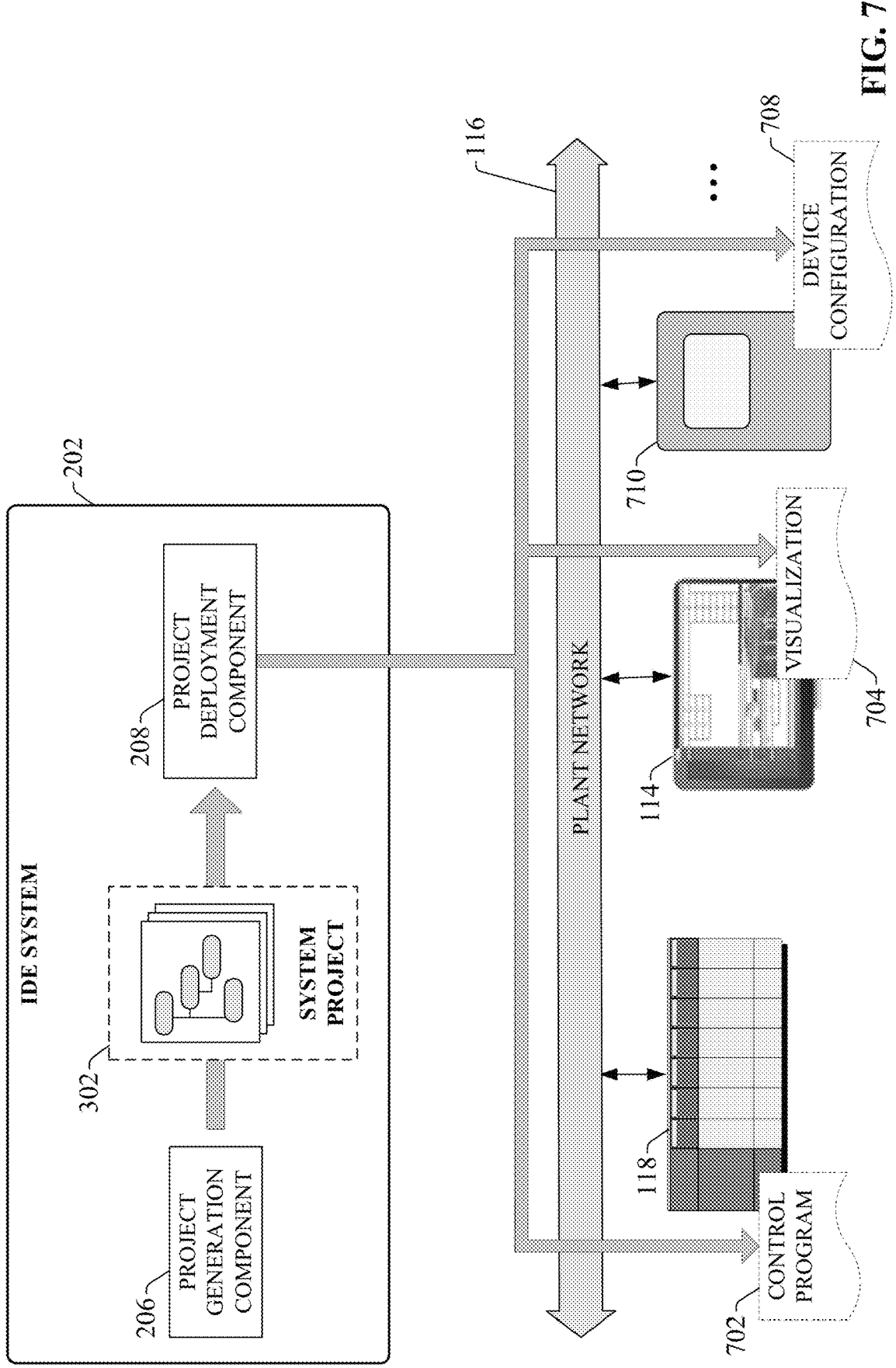
FIG. 7 is a diagram illustrating commissioning of a system project.

Once development and testing on a system project 302 has been completed, commissioning tools supported by the IDE system 202 can simplify the process of commissioning the project in the field. When the system project 302 for a given automation system has been completed, the system project 302 can be deployed to one or more target control devices for execution. FIG. 7 is a diagram illustrating commissioning of a system project 302. Project deployment component 208 can compile or otherwise translate a completed system project 302 into one or more executable files or configuration files that can be stored and executed on respective target industrial devices of the automation system (e.g., industrial controllers 118, HMI terminals 114 or other types of visualization systems, motor drives 710, telemetry devices, vision systems, safety relays, etc.).

Conventional control program development platforms require the developer to specify the type of industrial controller (e.g., the controller's model number) on which the control program will run prior to development, thereby binding the control programming to a specified controller. Controller-specific guardrails are then enforced during program development which limit how the program is developed given the capabilities of the selected controller. By contrast, some embodiments of the IDE system 202 can abstract project development from the specific controller type, allowing the designer to develop the system project 302 as a logical representation of the automation system in a manner that is agnostic to where and how the various control aspects of system project 302 will run. Once project development is complete and system project 302 is ready for commissioning, the user can specify (via user interface component 204) target devices on which respective aspects of the system project 302 are to be executed. In response, an allocation engine of the project deployment component 208 will translate aspects of the system project 302 to respective executable files formatted for storage and execution on their respective target devices.

For example, system project 302 may include—among other project aspects—control code, visualization screen definitions, and motor drive parameter definitions. Upon completion of project development, a user can identify which target devices—including an industrial controller 118, an HMI terminal 114, and a motor drive 710—are to execute or receive these respective aspects of the system project 302. Project deployment component 208 can then translate the controller code defined by the system project 302 to a control program file 702 formatted for execution on the specified industrial controller 118 and send this control program file 702 to the controller 118 (e.g., via plant network 116). Similarly, project deployment component 208 can translate the visualization definitions and motor drive parameter definitions to a visualization application 704 and a device configuration file 708, respectively, and deploy these files to their respective target devices for execution and/or device configuration.

In general, project deployment component 208 performs any conversions necessary to allow aspects of system project 302 to execute on the specified devices. Any inherent relationships, handshakes, or data sharing defined in the system project 302 are maintained regardless of how the various elements of the system project 302 are distributed. In this way, embodiments of the IDE system 202 can decouple the project from how and where the project is to be run. This also allows the same system project 302 to be commissioned at different plant facilities having different sets of control equipment. That is, some embodiments of the IDE system 202 can allocate project code to different target devices as a function of the particular devices found on-site. IDE system 202 can also allow some portions of the project file to be commissioned as an emulator or on a cloud-based controller.

As an alternative to having the user specify the target control devices to which the system project 302 is to be deployed, some embodiments of IDE system 202 can actively connect to the plant network 116 and discover available devices, ascertain the control hardware architecture present on the plant floor, infer appropriate target devices for respective executable aspects of system project 302, and deploy the system project 302 to these selected target devices. As part of this commissioning process, IDE system 202 can also connect to remote knowledgebases (e.g., web-based or cloud-based knowledgebases) to determine which discovered devices are out of date or require firmware upgrade to properly execute the system project 302. In this way, the IDE system 202 can serve as a link between device vendors and a customer's plant ecosystem via a trusted connection in the cloud.

Copies of system project 302 can be propagated to multiple plant facilities having varying equipment configurations using smart propagation, whereby the project deployment component 208 intelligently associates project components with the correct industrial asset or control device even if the equipment on-site does not perfectly match the defined target (e.g., if different pump types are found at different sites). For target devices that do not perfectly match the expected asset, project deployment component 208 can calculate the estimated impact of running the system project 302 on non-optimal target equipment and generate warnings or recommendations for mitigating expected deviations from optimal project execution.

Figure 8:
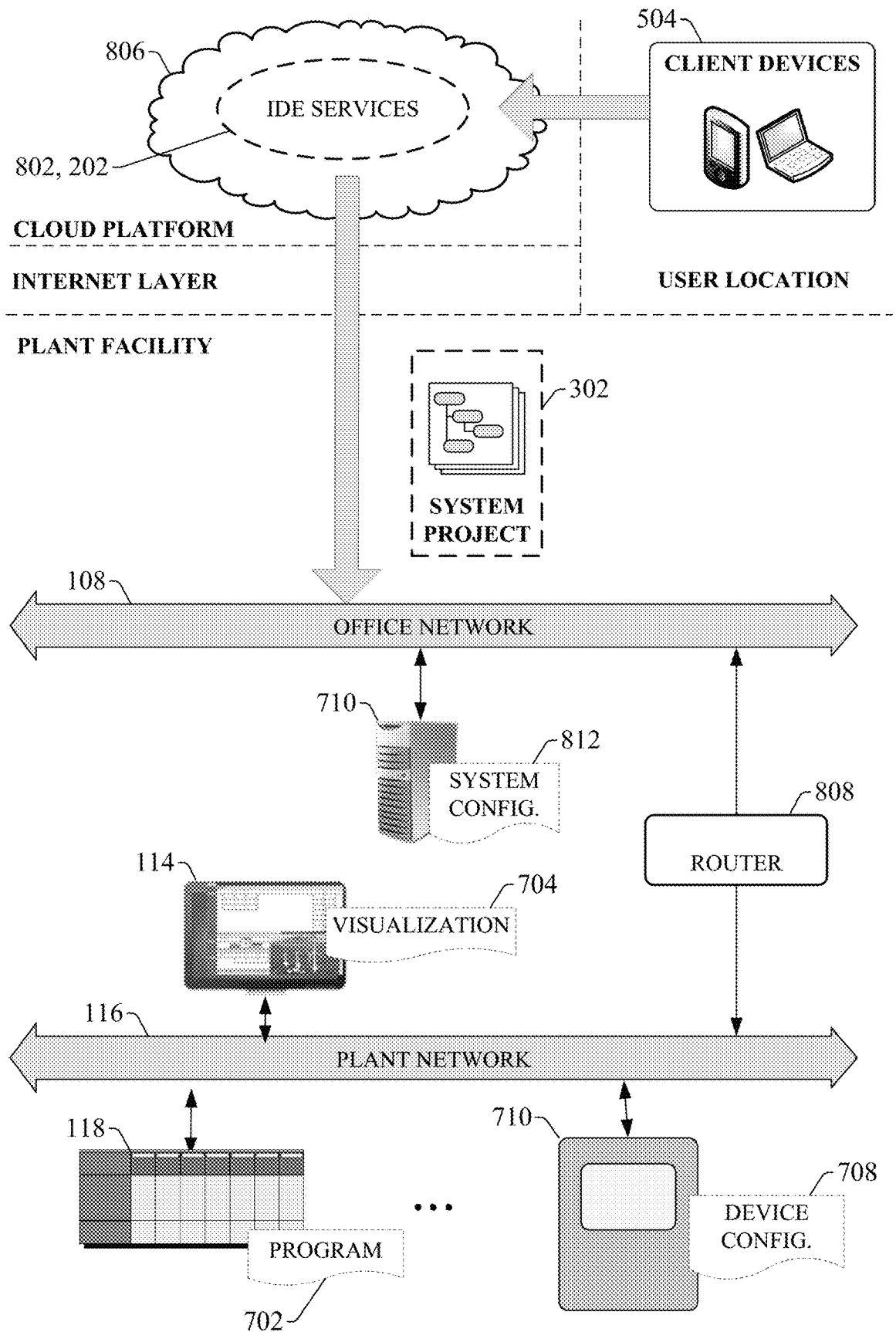
FIG. 8 is a diagram illustrating an example architecture in which cloud-based IDE services are used to develop and deploy industrial applications to a plant environment.

As noted above, some embodiments of IDE system 202 can be embodied on a cloud platform. FIG. 8 is a diagram illustrating an example architecture in which cloud-based IDE services 802 are used to develop and deploy industrial applications to a plant environment. In this example, the industrial environment includes one or more industrial controllers 118, HMI terminals 114, motor drives 710, servers 801 running higher level applications (e.g., ERP, MES, etc.), and other such industrial assets. These industrial assets are connected to a plant network 116 (e.g., a common industrial protocol network, an Ethernet/IP network, etc.) that facilitates data exchange between industrial devices on the plant floor. Plant network 116 may be a wired or a wireless network. In the illustrated example, the high-level servers 810 reside on a separate office network 108 that is connected to the plant network 116 (e.g., through a router 808 or other network infrastructure device).

In this example, IDE system 202 resides on a cloud platform 806 and executes as a set of cloud-based IDE service 802 that are accessible to authorized remote client devices 504. Cloud platform 806 can be any infrastructure that allows shared computing services (such as IDE services 802) to be accessed and utilized by cloud-capable devices. Cloud platform 806 can be a public cloud accessible via the Internet by devices 504 having Internet connectivity and appropriate authorizations to utilize the IDE services 802. In some scenarios, cloud platform 806 can be provided by a cloud provider as a platform-as-a-service (PaaS), and the IDE services 802 can reside and execute on the cloud platform 806 as a cloud-based service. In some such configurations, access to the cloud platform 806 and associated IDE services 802 can be provided to customers as a subscription service by an owner of the IDE services 802. Alternatively, cloud platform 806 can be a private cloud operated internally by the industrial enterprise (the owner of the plant facility). An example private cloud platform can comprise a set of servers hosting the IDE services 802 and residing on a corporate network protected by a firewall.

Cloud-based implementations of IDE system 202 can facilitate collaborative development by multiple remote developers who are authorized to access the IDE services 802. When a system project 302 is ready for deployment, the project 302 can be commissioned to the plant facility via a secure connection between the office network 108 or the plant network 116 and the cloud platform 806. As discussed above, the industrial IDE services 802 can translate system project 302 to one or more appropriate executable files—control program files 702, visualization applications 704, device configuration files 708, system configuration files 812—and deploy these files to the appropriate devices in the plant facility to facilitate implementation of the automation project.

Figure 9:
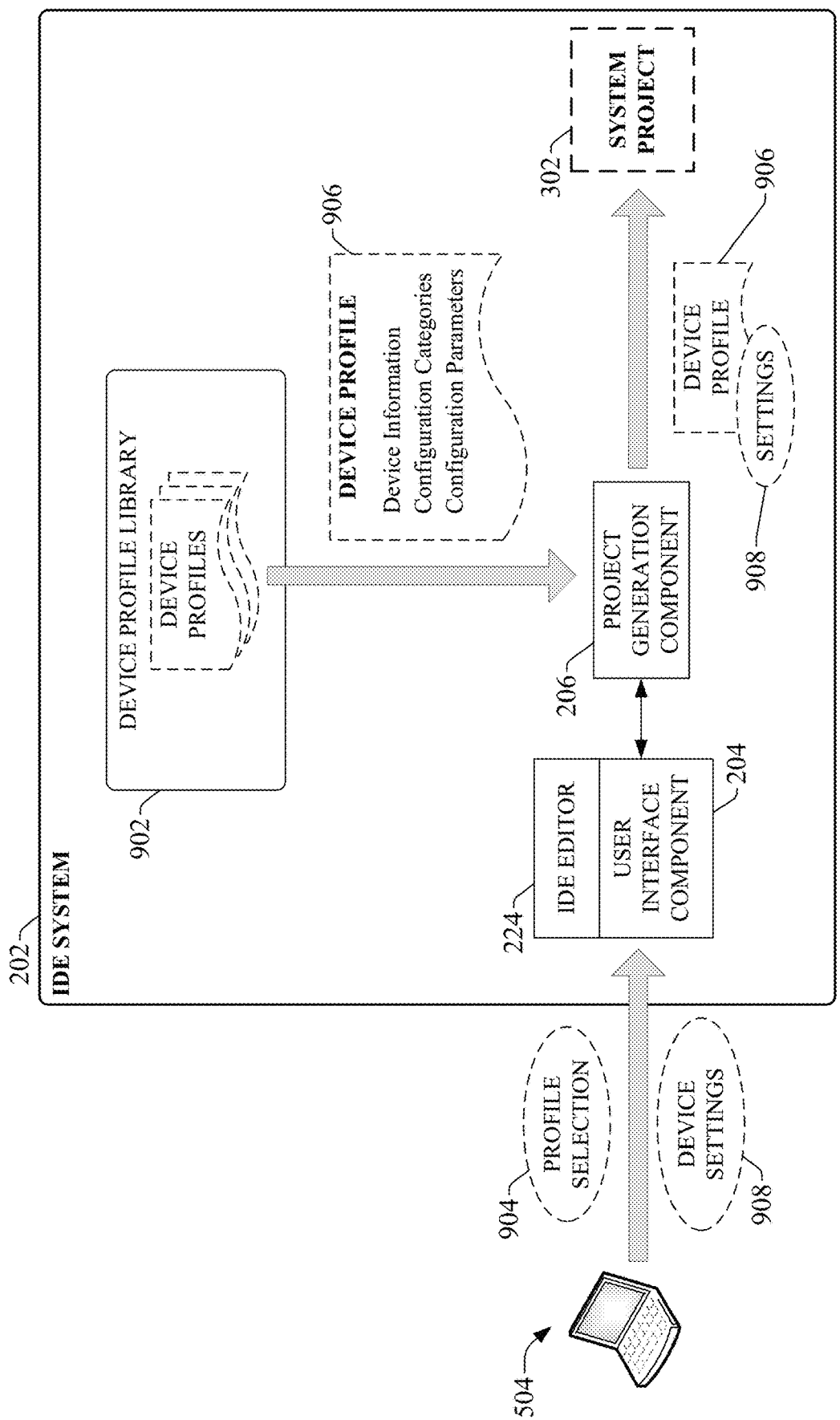
FIG. 9 is a diagram illustrating selection of device profiles from a profile library for inclusion in a system project.

Some embodiments of the industrial IDE system 202 can support the use of device profiles to facilitate setting values of configurable device parameters for devices that are to be included in the automation project. FIG. 9 is a diagram illustrating configuration of device parameters using device profiles 906. In general, each device profile 906 corresponds to a device type, and is a re-usable object or file that defines a set of configurable device parameters—e.g., network or communication settings, scale factors, input or output signal types, operating mode settings, tuning parameter values, maximum or minimum values, refresh rates, channel configurations, etc. —for its corresponding device type. Each device profile 906 can organize these device configuration parameters into categories to assist the user in locating a desired parameter. The device profile 906 can also record general information about the device, some of which can be modified by the user to customize a generic device type to reflect a specific device (an instance of the device type). Each device profile 906 can also define one or more graphical views or interfaces that will be rendered when the profile 906 is invoked. These views present the device's information and configurable parameters in an organized manner for viewing and editing by the user.

The IDE system 202 can store device profiles 906 for multiple types of devices in a device profile library 902 for selective inclusion in system projects 302. Device profiles 906 can be defined for a variety of different industrial devices or systems, including but not limited to industrial controller modules (e.g., analog or digital input and output modules, networking or scanner modules, special function modules, etc.), variable frequency drives, telemetry devices, safety relays, vision systems, or other such devices.

As illustrated in FIG. 9, during development of a system project 302, a user can interact with the IDE system's development interface to select a device profile 906 to be added to the project 302. The selected profile 906 typically corresponds to a type of device that will be included in the automation system for which the project 302 is being developed. Once a selected device profile 906 has been added to the system project 302 (via submission of profile selection input 904), the user can invoke device configuration interfaces defined by the device profile 906 and interact with these configuration interfaces to set values of device parameters or settings 908 for the device represented by the profile 906. When the system project 302 is subsequently deployed to the industrial controller 118 or other devices that make up the automation system (as illustrated in FIGS. 7 and 8), the device configuration settings 908 that had been submitted by the user are written to corresponding registers of the relevant field devices (e.g., the industrial controller 118 in the case of I/O modules or smart devices connected to the controller 118, or other target devices that are subject to the device settings).

Figure 10:
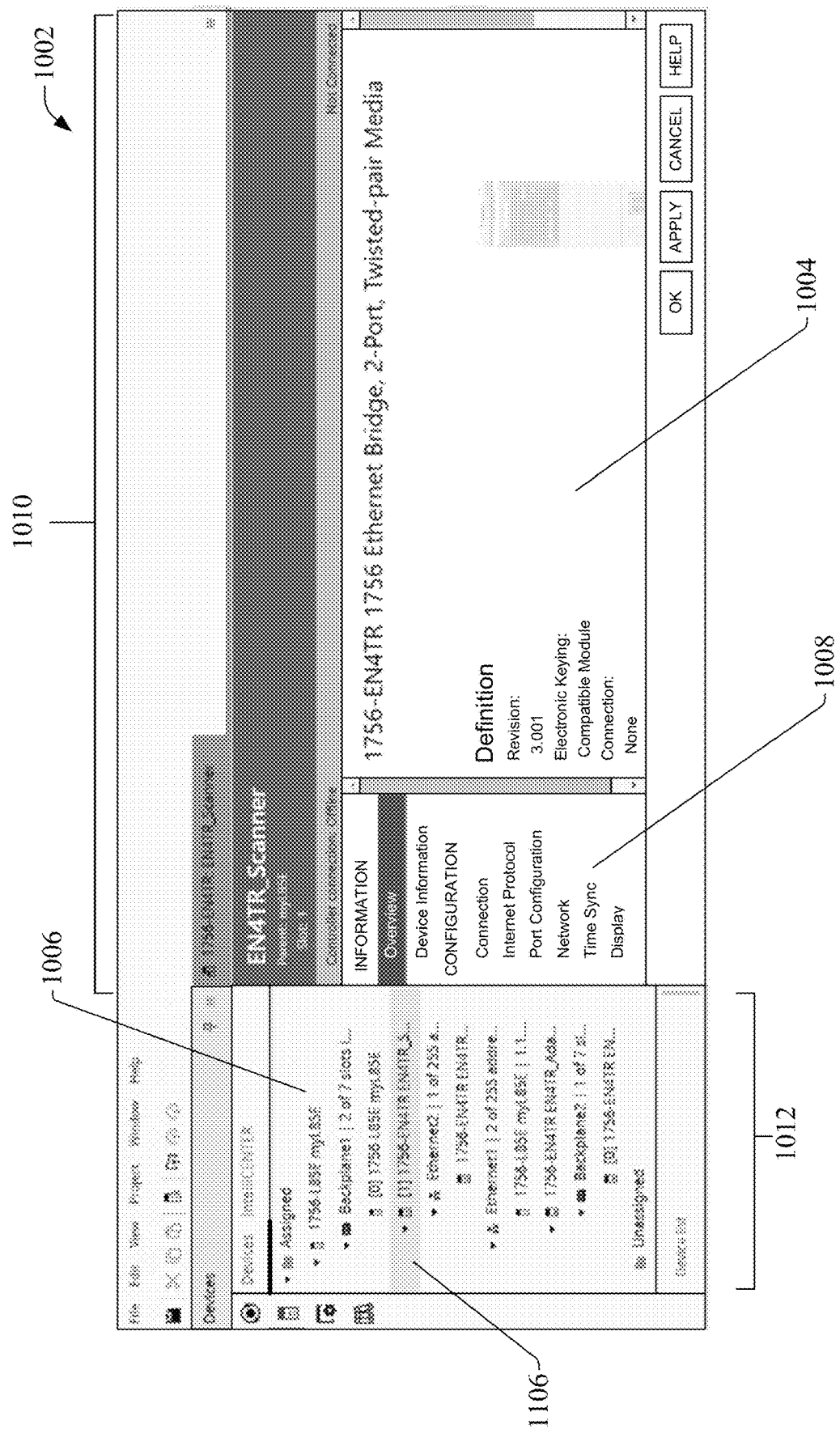
FIG. 10 is an example device profile interface that can be rendered on a client device by an industrial IDE.

FIG. 10 is an example development interface 1002 that can be rendered on a client device by the industrial IDE system's user interface component 204. Development interface 1002 is organized into panels and workspaces for navigating and editing the system project 302. The example interface 1002 depicted in FIG. 10 comprises a main workspace area 1010 that serves as the IDE system's primary work area and an explorer panel 1012 located adjacent to the main workspace area 1010. The explorer panel 1012 displays a navigation tree 1006 comprising a hierarchical arrangement of selectable nodes representing elements of the system project 302 being developed. In general, selection of a project element from the navigation tree 1006 causes the main workspace area 1010 to render project content corresponding to the selected element, such as ladder logic or other types of control code, program routines, controller tag definitions, device configuration information, or other aspects of the project 302. The user can interact with these project elements within the main workspace area 1010 to perform such development functions as writing or editing controller code (e.g., ladder logic, function block diagrams, structured text, etc.), configuring device parameter settings, defining controller tags, or other such project development functions.

Figure 11:
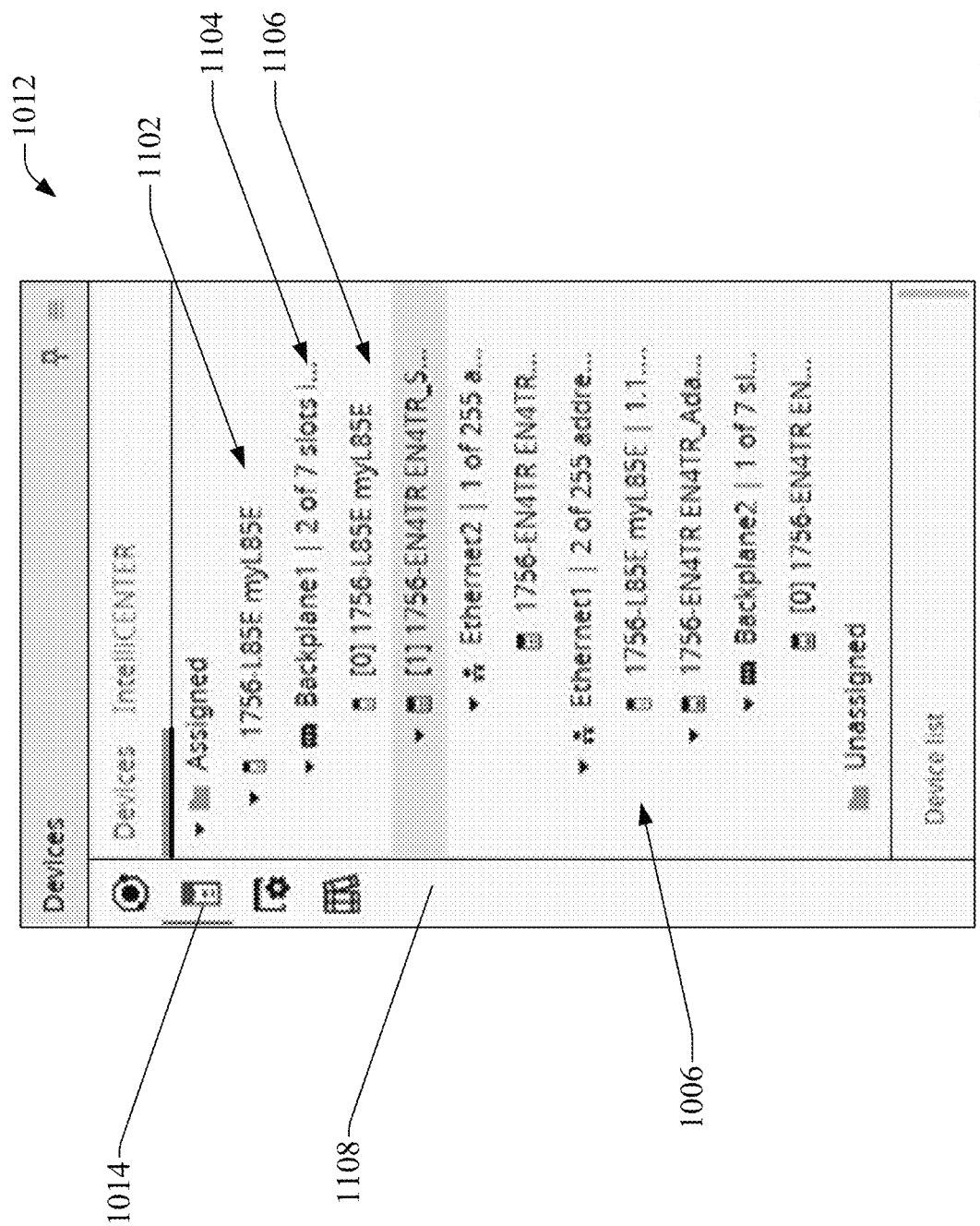
FIG. 11 is a view of a device profile interface explorer panel and its associated navigation tree.

FIG. 11 is a view of the explorer panel 1012 and its associated navigation tree 1006 in isolation. As noted above, explorer panel 1012 serves as a means for navigating and viewing content of a system project 302 and supports various ways for performing this navigation. Selectable viewing categories are rendered as selectable explorer icons in a control bar 1108 pinned to the left-side edge of the explorer panel 1012. Selection of an explorer icon from the control bar 1108 sets the type of project content to be browsed via the Explorer panel 1012. In the scenario depicted in FIG. 11, a Devices view icon 1014 has been selected in the control bar 1108, causing the explorer panel 1012 to display, as the navigation tree 1006, a hierarchical arrangement of device nodes 1106 representing the devices defined for the system project 302.

For an example system project 302, the device navigation tree 1006 can include a controller node 1102 representing an industrial controller 118 to be programmed as part of the system project 302. A backplane node 1104 is defined as a child node of the controller node 1102 and represents the backplane of the industrial controller 118 on which one or more devices or modules will be installed. Any modules or devices to be connected to the controller's backplane are represented as device nodes 1106 below the backplane node 1104. Example devices that can be associated with the controller can include, but are not limited to, digital or analog input modules, digital or analog output modules, networking or scanning modules, analytic modules, special function modules, smart industrial devices, motor drives such as variable frequency drives, or other such devices. Per the workflow illustrated in FIG. 9, a user can add a new device to the project by adding a new device node 1106—representing a device profile 906 for the type of the device—to the device navigation tree 1006. Any suitable interaction can be used to add a new device to the navigation tree 1006. For example, the user may select the backplane node 1104 and invoke a device profile selection window (e.g., by right-clicking on the backplane node 1104) that displays a list of available types of devices that can be added to the project 302. Each device type has a corresponding device profile 906 stored in the system's device profile library 902. The device profile 906 defines information about the corresponding device type, as well as any device parameters associated with the device type whose values can be set by the user.

The explorer icons rendered on the control bar 1108 can also include an Application icon that causes the explorer panel 1012 to display a list of applications—e.g., industrial control programs such as ladder logic routines—that make up the system project 302. This viewing mode allows the user to develop, view, and edit control programs within the main workspace area 1010. These control programs will be installed and executed on the industrial controller 118.

Returning to FIG. 10, selecting a device node 1106 in the navigation tree 1006 causes the main workspace area 1010 to display an interactive device configuration interface for viewing and editing configuration parameters for the selected device. Device information and configurable device parameters displayed on this device configuration interface are defined by the device profile 906 for the selected device. In the example depicted in FIG. 10, the device configuration interface comprises a main configuration area 1004 and a category window 1008 that lists various informational and configuration categories for the device. Selecting a category from this window 1008 causes the main device configuration area 1004 to render information or configurable device parameters relating to the selected category.

Informational categories listed in the category window 1008 can include an Overview category and a more detailed Device Information category. Selection of the Overview category can cause summary information about the device—e.g., model number and revision number of the device, device type, a type of electronic keying, or other such information—to be rendered in the main workspace area 1010. In the example depicted in FIG. 10, the user has selected a device node 1106 representing an ethernet bridge module that will be installed on the controller's backplane, and has selected the Overview category within the category window 1008 so that general overview information for the module can be viewed.

Figure 12:
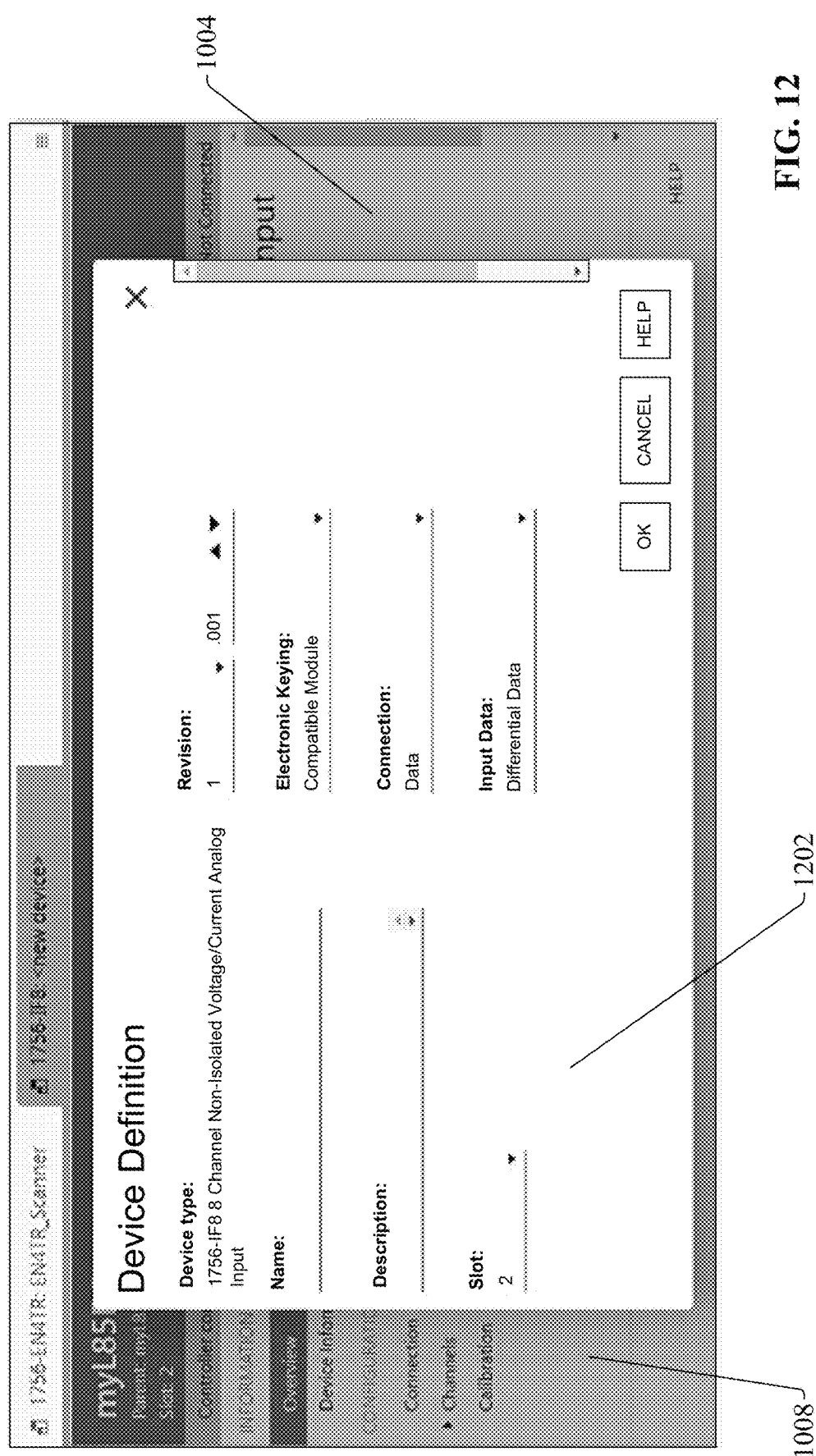
FIG. 12 is a view of the main workspace area of a device profile interface in which a Device Information editing window has been invoked for the selected device.

Depending on the type of device, some of the device information accessible via the Overview or Device Information categories can be edited by the user. FIG. 12 is a view of the main workspace area 1010 in which a Device Information editing window 1202 has been invoked for the selected device. This window 1202 includes data fields that allow the user to enter or edit various items of information about the device, including but not limited to a name of the device, a description of the device, a controller slot number in which the device is to be installed (if the device is a module to be installed on a controller backplane), revision information, a type of electronic keying, a type of connection, a type of input data, or other such information.

Figure 13A:
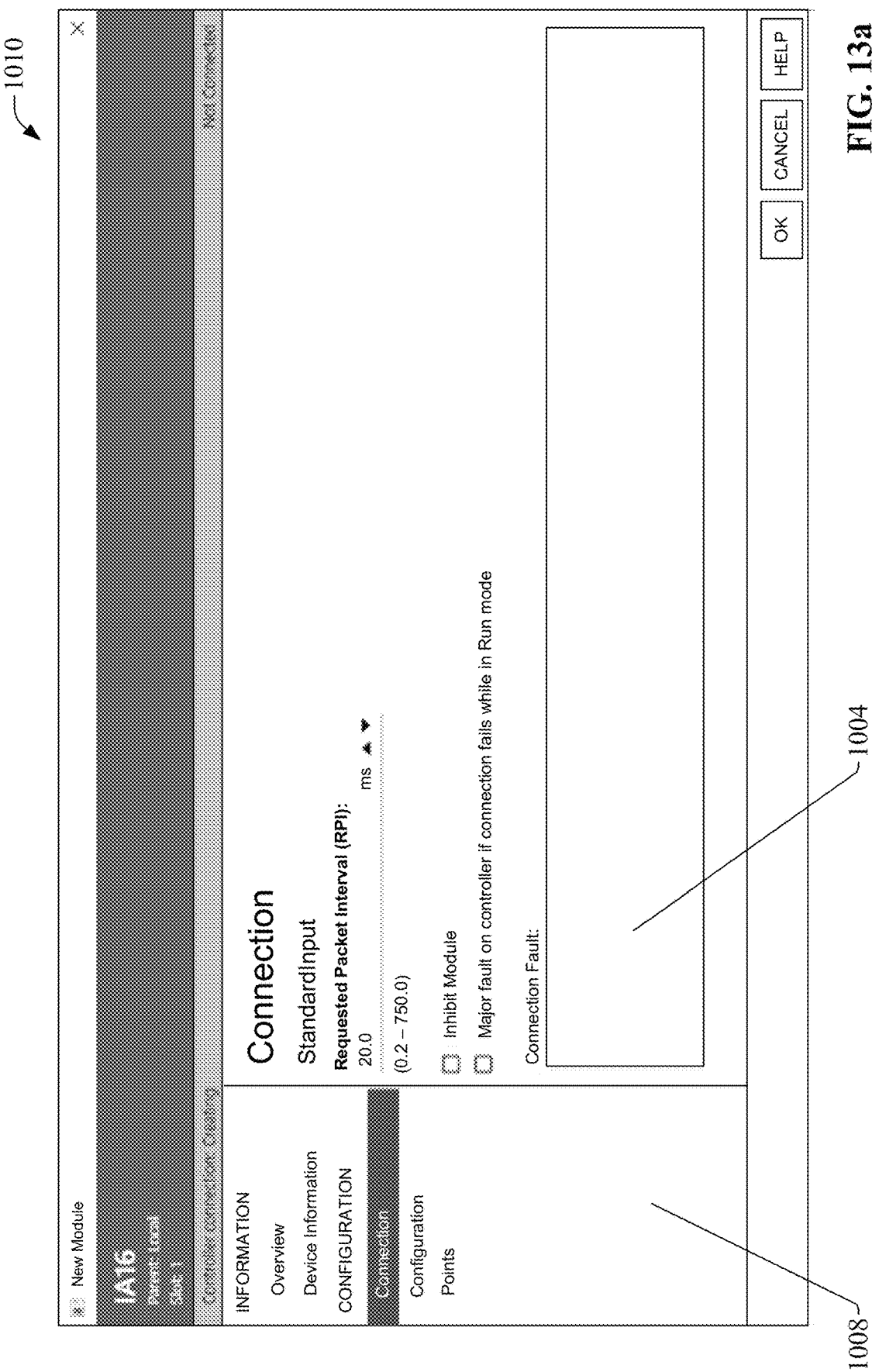
FIG. 13a is a view of a main workspace area of a device profile interface in which the user has selected a 16-point digital input module.

Returning again to FIG. 10, configuration categories listed in the category window 1008 can include, for example, a Connection category, an Internet Protocol category, a Port Configuration category, a Network category, a Time Sync category, a Display category, a Channels category, a Calibration category, an I/O points category, or other such configuration categories. The available configuration categories, as well as the specific parameters that are accessible under each category, can depend on the type of device being viewed. For example, FIG. 13a is a view of the main workspace area 1010 in which the user has selected a 16-point digital input module. Available configuration categories listed in the Category window 1008 for this type of device include a Connection category, a Configuration category, and a Points category. The Connection category has been selected in FIG. 13, causing the configuration area 1004 to display configurable connection parameters for the module. These parameters include a packet interval timing, an indication as to whether the module is to be inhibited, and an indication as to whether a connection failure is to trigger a major fault on the controller 118. The configuration area renders interactive graphical controls—e.g., data entry boxes, drop down selection windows, binary check boxes, etc.—for each configurable parameter to allow the user to enter values of these parameters.

Figure 13B:
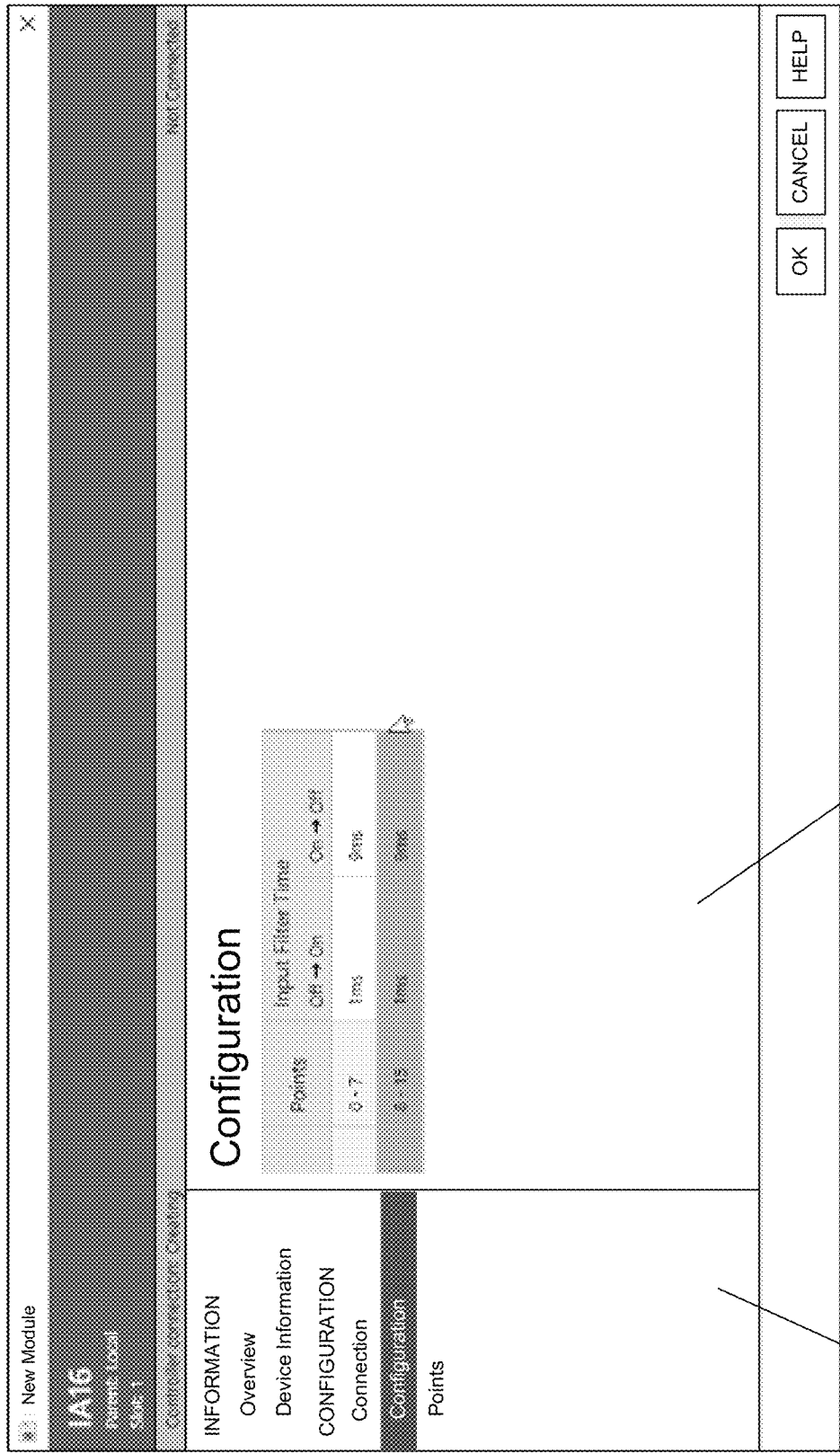
FIG. 13b is a view of the main workspace area of a device profile interface in which the Configuration category has been selected in the Category window.
Figure 13C:
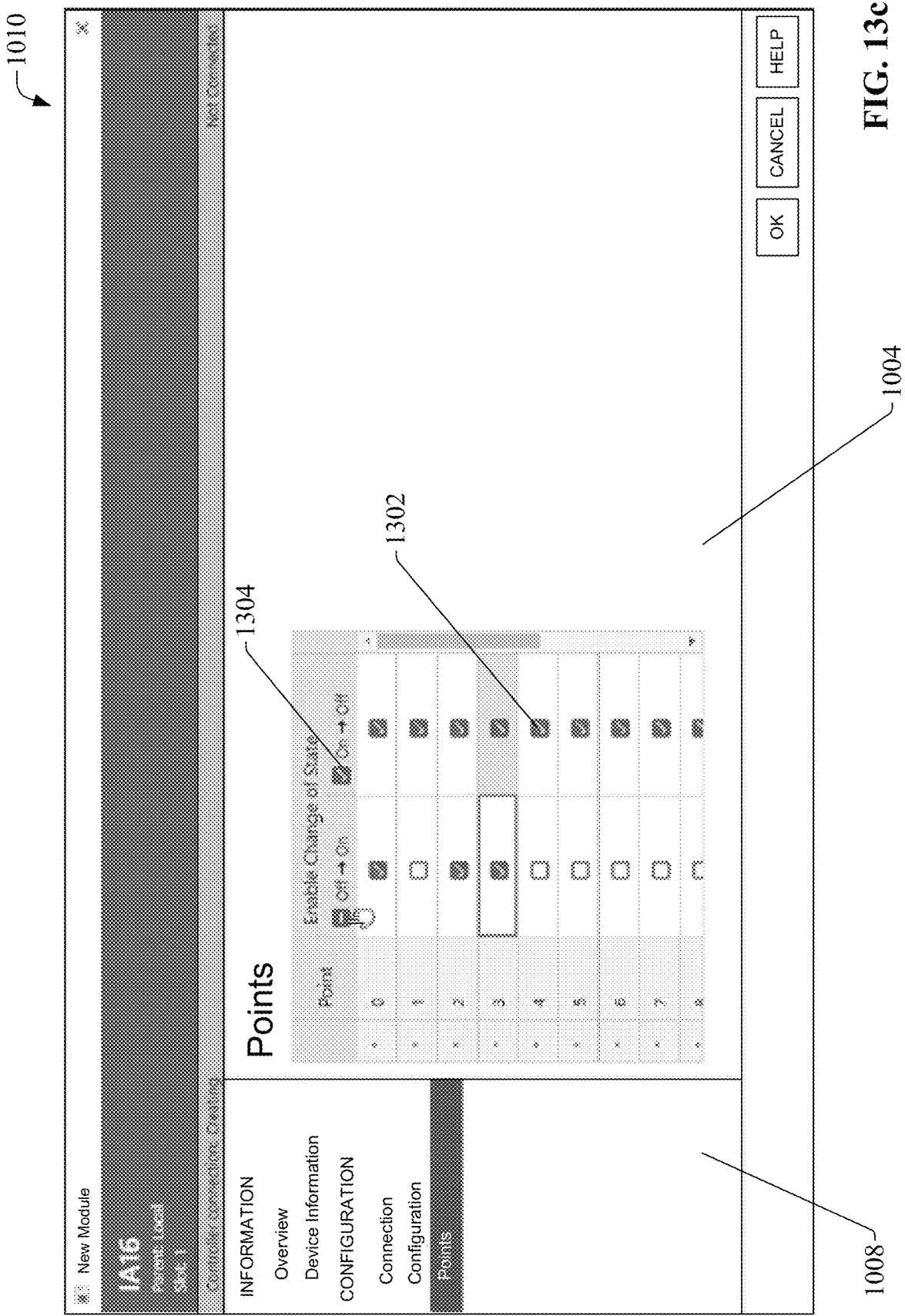
FIG. 13c is a view of the main workspace area of a device profile interface in which the Points category has been selected in the Category window.

FIG. 13b is a view of the main workspace area 1010 in which the Configuration category has been selected in the Category window 1008. For the selected analog input module, selecting this category causes the configuration area 1004 to display an interactive table that allows the user to set input filter times for groups of input points. FIG. 13c is a view of the main workspace area 1010 in which the Points category has been selected in the Category window 1008. This invokes another interactive table in the configuration area 1004 that allows the user to selectively enable or disable changes of state—both on-to-off and off-to-on transitions—for each input point of the module. In contrast to generic table-based interfaces, this graphical configuration interface comprises both individual checkbox controls 1302 that allow the user to enable or disable state changes for individual input points, as well as global checkbox controls 1304 that allow the user to enable or disable state changes for all of the module's input points with a single selection input.

Figure 14A:
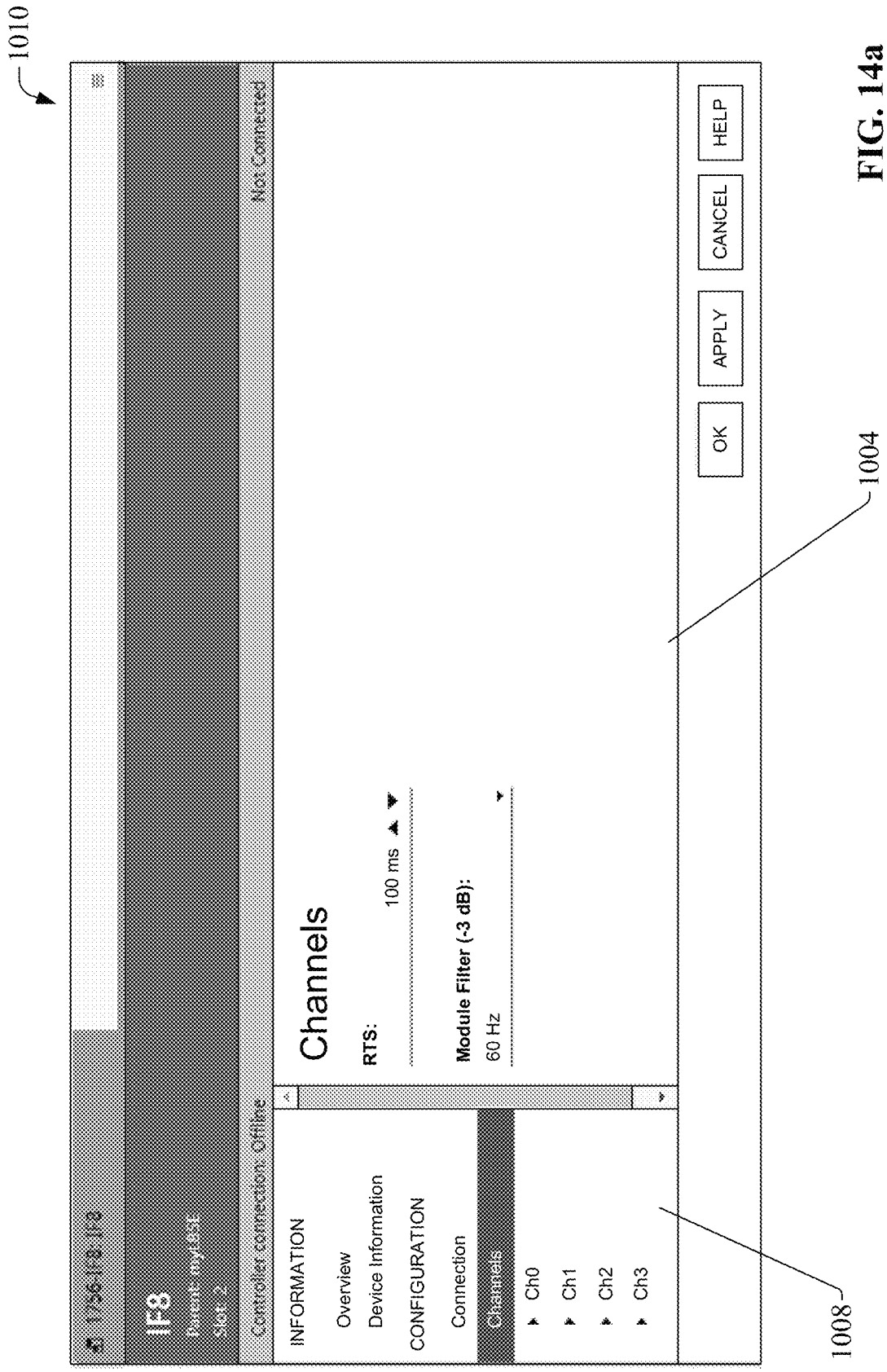
FIG. 14a is a view of the main workspace area of a device profile interface in which an 8-channel analog input module has been selected.
Figure 14B:
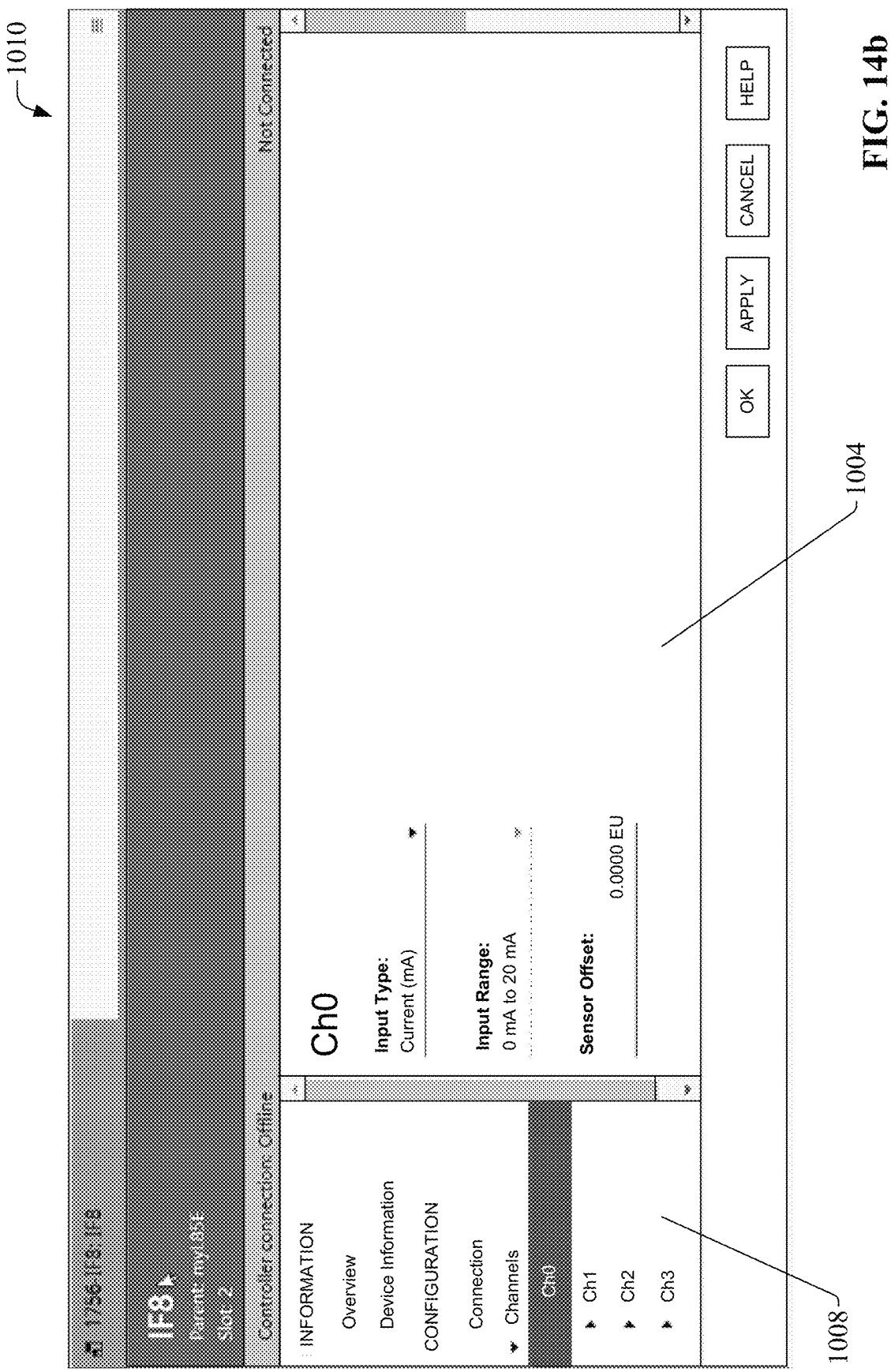
FIG. 14b is a view of the main workspace area of a device profile interface in which a user has selected to set configuration parameters for individual channels of an input module.
Figure 14C:
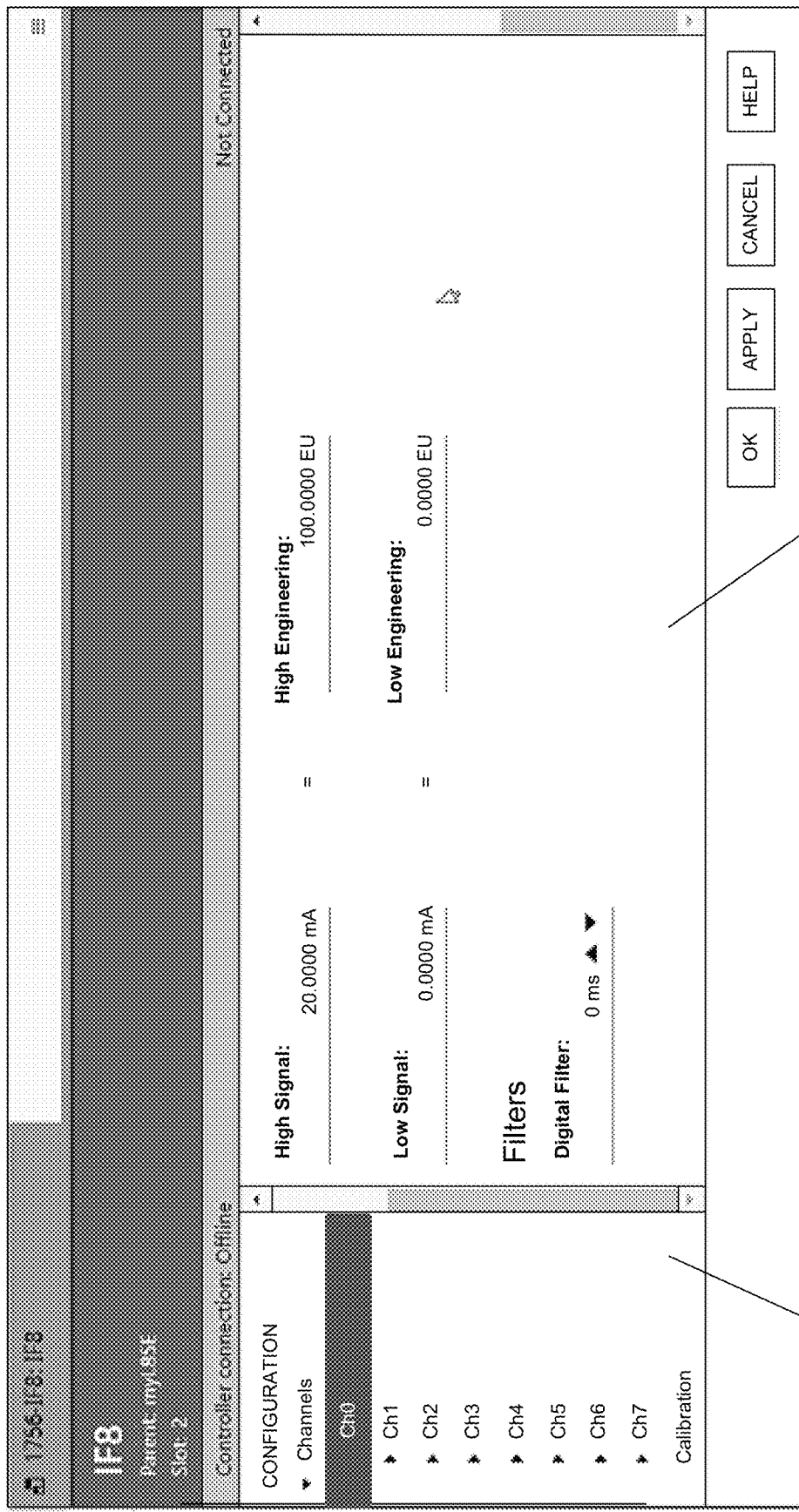
FIG. 14c is another view of the main workspace area of a device profile interface in which a user has selected to set configuration parameters for individual channels of an input module.

As noted above, the device profile 906 for the device being configured defines the configuration parameters that will be presented for viewing and editing in the main workspace area. FIG. 14*a* is a view of the main workspace area 1010 in which another type of device—an 8-channel analog input module—has been selected. In this scenario, the configuration categories listed in the Category window 1008 include a Channels category for configuring the analog input channels of the module. General channel parameters that are applicable to all channels—including the real time sampling (RTS) period and the module filter frequency—are rendered in the configuration area 1004 and can be edited by the user. In addition, configuration parameters for each individual channel can be set within the configuration area 1004, as shown in FIGS. 14*b* and 14*c*. These channel-specific parameters can include, but are not limited to, a type of input signal provided to the channel (e.g., current or voltage), a range of the input signal (e.g., 4-20 milliamp, 0-10 volts, etc.), an offset value for the channel, high and low input signal limits, digital filter value, or other such configuration settings.

In some embodiments, the IDE system 202 can be configured to generate dynamic feedback in response to determining that the user has submitted a device configuration parameter value that is not within a valid range for the edited parameter. In this regard, some device profiles 906 can define ranges of valid values for respective device parameters. As the user submits device configuration parameter values, the project generation component 206 can verify that each parameter value submitted by the user is within the valid ranges. If the user enters a parameter value that is outside that parameter's valid range, the user interface component 204 can render a notification on the development interface 1002 indicating that the value entered by the user is invalid. The project generation component 206 can reject any submitted parameter values that are outside their valid ranges.

The device configuration interfaces illustrated in FIGS. 10-14*c* and described above provide an intuitive interface for configuring industrial devices used in the system project 302. The device profile library 902 can store device profiles 906 for devices offered by multiple different device vendors, and the IDE system's interface allows these devices to be configured using a common device configuration workflow regardless of device vendor. The graphical device configuration interfaces generated by the IDE system 202 offer a more intuitive configuration workflow relative to more generic table-based device configuration interfaces. In some embodiments, the IDE system 202 can generate the device configuration interfaces using a web-based format, such as hypertext markup language (HTML), allowing the interfaces to be executed on a cloud platform or internet server and served to any type of device that supports web browsing. This format also allows the resulting device configuration interfaces to support a greater degree of customization relative to simple text-based device configuration profiles.

Figure 15:
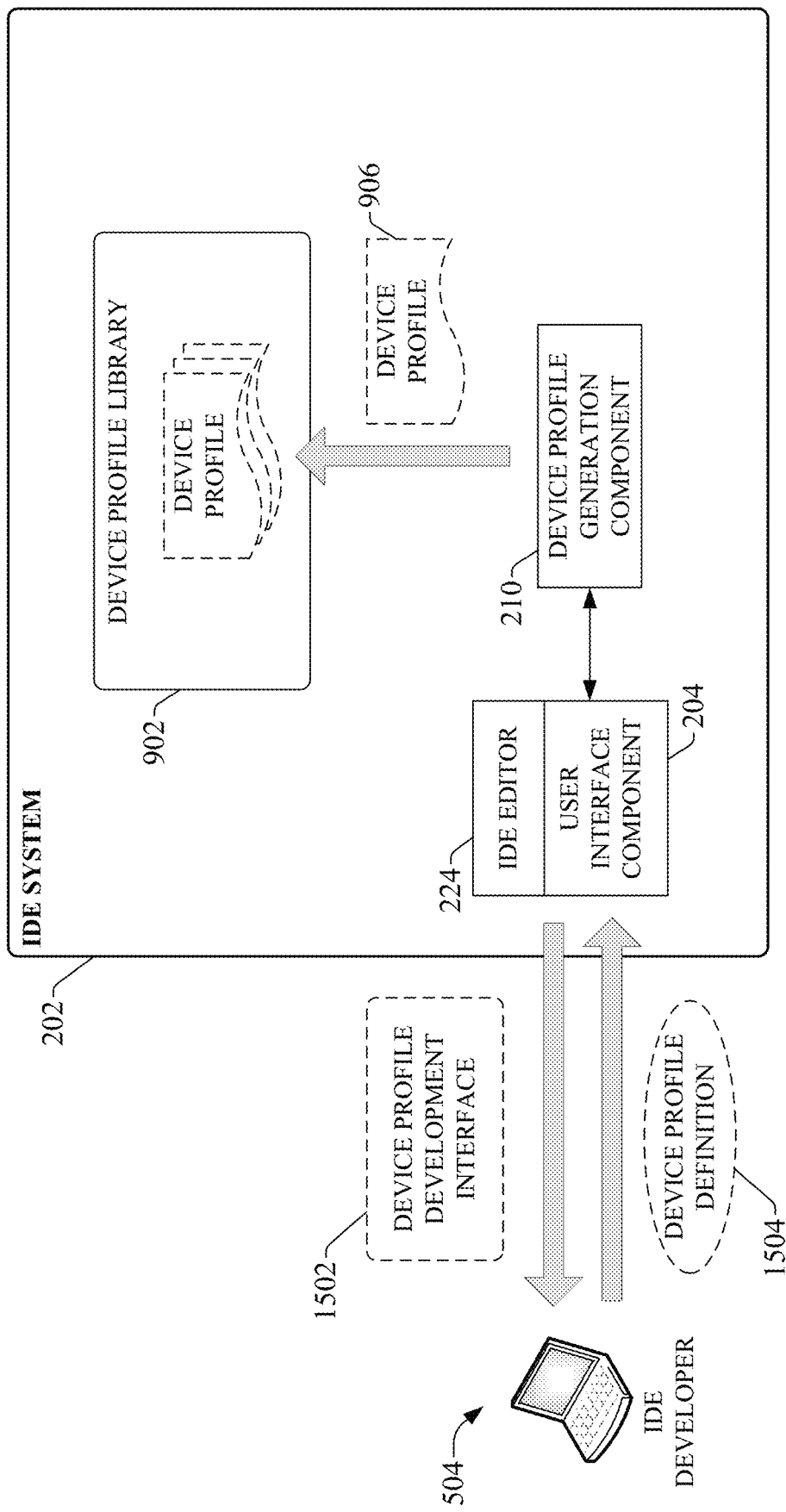
FIG. 15 is a diagram illustrating creation of device profiles for storage in the device profile library.

In some embodiments, the IDE system's capabilities can be extended to support creation of device profiles 906 using an intuitive graphical interface. FIG. 15 is a diagram illustrating creation of device profiles 906 for storage in the device profile library 902. In an example embodiment, the IDE system 202 can allow the user to launch a device profile development environment from the IDE system's main project development environment. The user interface component 204 can serve this profile development environment to a client device 504 as a device profile development interface 1502. In some embodiments, the device profile development interface 1502 can be launched from the IDE system's main development interface 1002 and may be accessible only to users who submit suitable administrative credentials that authorize the user (e.g., an IDE backend developer) to design and modify device profiles 906 that will be made available in the profile library 902. As will be described in more detail below, the device profile development interface 1502 renders predefined templates for configuring device profile interfaces and views such as those described above. The user can submit device profile definition data 1504 via interaction with these templates, and a device profile generation component 210 translates this device profile definition data 1504 into a device profile 906, which is stored in the device profile library 902 for selective inclusion in system projects 302 by end users of the IDE system 202 (as illustrated in FIG. 9).

As noted above, a given device profile 906 defines the contents and layout of the graphical views—e.g., the category window 1008 and configuration area 1004—that serve as user interfaces for its corresponding device. These views allow the user to browse, view, and edit the corresponding device's configuration parameters. In some cases, there may be multiple industrial device types that have broadly similar sets of configurable parameters, and which can be represented by similar device profile views, taking into account the differences between the devices' communication properties or configuration parameters. In order to limit the total number of device profiles 906 that must be stored in the device profile library 902 to accommodate these similar but variable device types, as well as to simplify the task of developing these profiles 906, one or more embodiments of the IDE system 202 can support the use of device profile templates which define respective profile presentation designs, and which can be customized by an IDE developer for use with a specific device type using configuration files. These configuration files can be used to bind a device profile template to selected industrial devices and associated backend IDE services during runtime as a function of the device type assigned to the profile 906.

Figure 16:
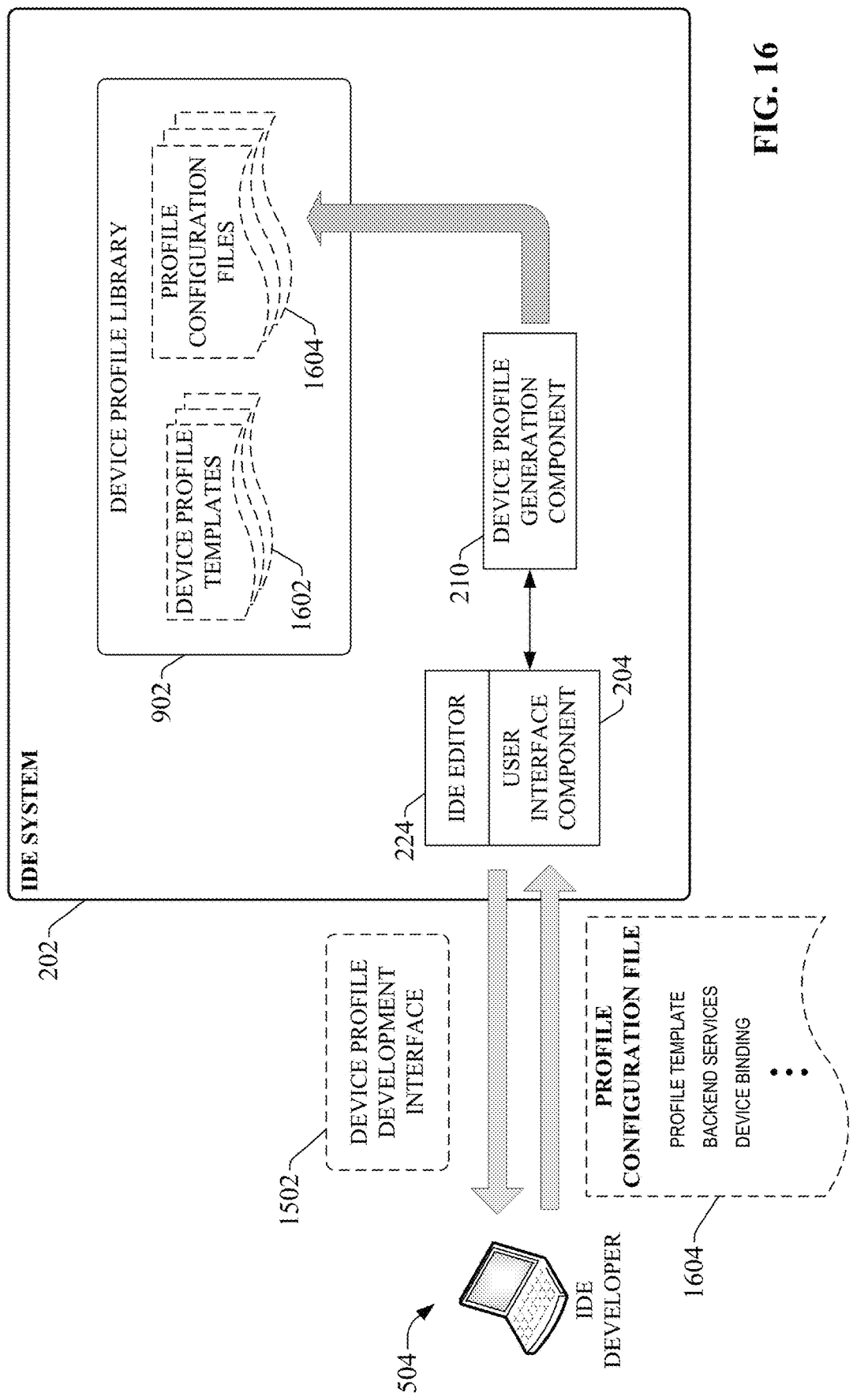
FIG. 16 is a diagram illustrating creation and storage of profile configuration files that define bindings between selected device profile templates and backend services, as well between the device profile templates and automation device data.

FIG. 16 is a diagram illustrating creation and storage of profile configuration files 1604 that define bindings between selected device profile templates 1602 and backend services, as well between the device profile templates 1602 and automation device data. In general, the device profile development interface 1502 and its associated profile development toolkit act as a framework for device profile developers to create new device profiles 906 for storage in the device profile library 902 (see FIG. 15). These new profiles 906 can then be made available to end users for use in their system projects 302, as described above. In this example, the device profile library 902 maintains predefined device profile templates 1602, which define respective different device profile views or presentations. For example, in the case of device profiles 906 having the general presentation format illustrated in FIGS. 10-14*c*, a given device profile template 1602 may define such presentation properties as the informational and configuration categories listed in the category window 1008 (or other controls for navigating different views of the profile's interface), the device parameters or information to be rendered in the main device configuration area 1004 in response to selection of each category, the arrangement of parameter data fields in the configuration area 1004, text labels or descriptors associated with each parameter data field or otherwise rendered on the profile's interface, or other such properties of the device profile view.

Each device profile templates 1602 serves as a common view that can be used as the basis for multiple different device profiles 906 for respective different devices. The profile development toolset allows a developer to reuse the presentation components defined by a device profile template 1602 for different device profiles 906. To allow for variations between different device types that will use a common device profile template 1602, the IDE system 202 allows the user to create and submit profile configuration files 1604 for respective different device profiles 906. A profile configuration file 1604 defines bindings between a device profile template 1602 and specified IDE backend services that drive the resulting device profile's functionality. Profile configuration files 1604 can comprise text files that are easily edited by a profile developer to specify the device profile template 1602 to be used for the device profile 906 being created—which defines the presentation or view for the profile 906— and the IDE backend services to which the profile 906 is to be bound.

In general, the IDE system 202 can include different backend services that define how to communicate with and understand respective different types of automation devices (e.g., variable frequency drives, industrial controllers, safety relays, etc.). These backend services can define, for example, communication protocols or standards to be used to communicate with the device, data structures or formats to be used for device communications or data presentation, instructions regarding how to interpret data received from the device, information regarding sources of different data items to be displayed on the profile (e.g., data tags, data registers, or other data sources on the corresponding device that are to be used to populate respective data fields defined by the device profile template 1602), or other such information that can be used to drive device-specific functionality of the resulting device profile 906. These different backend services will typically be developed by a profile developer for a specific device or group of devices corresponding to a particular device type. To create a device profile 906 for a new device, the developer can select a predefined device profile template 1602 defining a presentation or view to be used for the new device, and bind the selected template 1602 to the appropriate backend services using a profile configuration file 1604.

Profile configuration files 1604 can also be used to bind a device profile template 1602 to the specific automation device to be represented by the device profile 906. This can include, for example, using the profile configuration file 1604 to define bindings between data fields of the device profile template 1602 and specified data tags, data registers, configuration parameters, or other data sources on the industrial device. In some embodiments, the profile configuration file 1604 for a given device profile 906 can also define such properties as valid ranges of values for respective device configuration parameters, which can be used during runtime to prevent end users from entering invalid values for the device's parameters. The profile configuration file 1604 can also be used to define valid data types or formats for respective data fields of the device profile template 1602.

In some embodiments, the backend services binding and device binding for a given device profile 906 can be defined using a single profile configuration file 1604 created for the profile 906. In other embodiments, separate profile configuration files 1604 can be assigned to the same device profile 906 to define the backend service binding and the device binding, respectively. The profile configuration files 1604 are editable text files having a format that is translatable by the project generation component 206 to customize a selected device profile template 1602 for use with a specific industrial device or device type (e.g., specific models of industrial controllers, variable frequency drives, safety relays, or other such devices). Since the profile configuration files 1604 are text files, a new profile configuration file 1604 for a new device profile 906 can be created by copying an existing configuration file 1604 for another device profile 906; editing the content of the configuration file 1604 as needed to define the correct backend service bindings, device bindings, or other profile properties; and saving the edited configuration file 1604 for the new profile 906. Each profile configuration file 1604 can also include information identifying the device profile template 1602 to which the configuration file 1604 will be applied.

Figure 17:
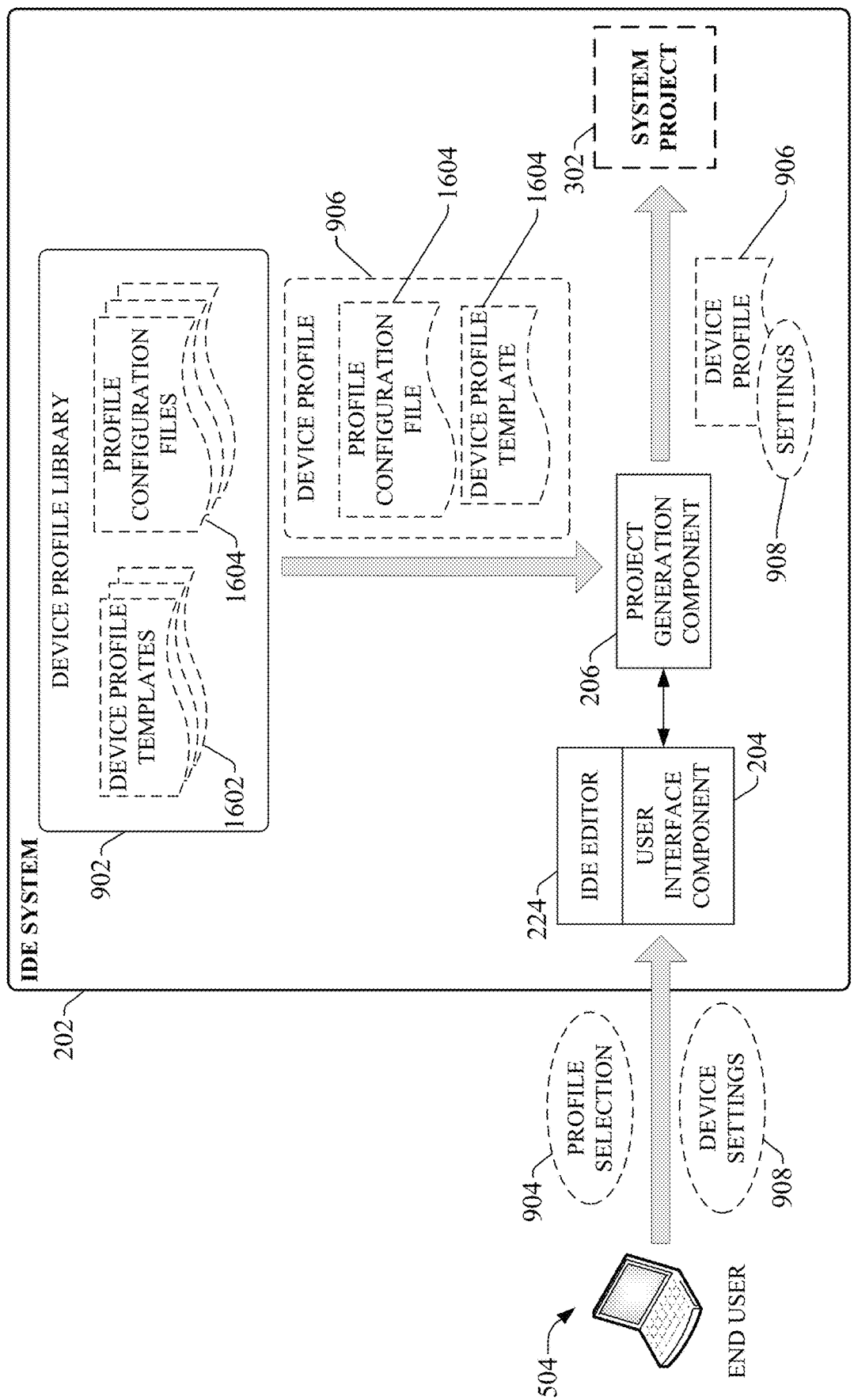
FIG. 17 is a diagram illustrating addition of device profiles to a system project by an end user of the IDE system, and use of the device profile to configure device parameters of a corresponding industrial device.

Taken together, the selected device profile template 1602 and the profile configuration file 1604 define the device profile 906 for the new device. The profile configuration files 1604 can be stored in the device profile library 902 together with the device profile templates 1602, and collectively define the device profiles 906 that are available for selective inclusion in system projects 302, as described above in connection with FIG. 9. FIG. 17 is a diagram illustrating addition of device profiles 906 to a system project 302 by an end user of the IDE system 202, and use of the device profile 906 to configure device parameters of a corresponding industrial device. In this example, the workflow and interfaces for adding device profiles 906 to the system project 302 are the same as those described above in connection with FIGS. 9-11, and the views rendered by the profiles 906 for viewing device information and parameters can conform to the general formats described above in connection with FIGS. 10-14*c*. For example, a device profile 906 can be selected from the library 902 and added to the project 302 by via interaction with the device navigation tree 1006. The user can then invoke the device configuration interfaces defined by the device profile 906 and interact with these configuration interfaces to set values of device parameters or settings 908 for the device represented by the profile 906.

In this example, the selected device profile 906 comprises the device profile template 1602 that had been selected for the profile 906 by the profile developer, together with the profile configuration file 1604 that was created and assigned to the profile 906. The device profile template 1602 defines the layouts of the profile's device configuration interfaces (that is, the graphical presentations or views rendered by the device profile 906 for viewing and editing device parameters), and the profile configuration file 1604 establishes the bindings (e.g., the data connections and interactions) between the device profile template 1602 and the backend IDE services for the specific device or device type represented by the device profile 906. The profile configuration file 1604 (or a separate profile configuration file 1604 included as part of the device profile definition) also establishes data bindings between the device profile template 1602 and the sources of device data that will populate the data fields of the profile 906 (e.g., the data tags or data registers to be mapped to each data field of the profile 906). According to this architecture, the same data profile template 1602 can be used for multiple different device profiles 906, each of which can connect to different device-specific backend services and device-side data sources as directed by the profile configuration file 1604. In general, the profile configuration file 1604 associated with a device profile 906 instructs the project generation component 206 how to interpret the associated device profile template 1602, which backend services are to be used to drive the profile's functionality (e.g., the services that define the communication protocols for exchanging data with the corresponding physical device), and how to connect the template's data fields to corresponding sources of data (e.g., data tags, data registers, smart objects, etc.) on the physical industrial device represented by the profile 906.

In some architectures, different backend services may execute on respective different servers associated with the IDE system 202. In such scenarios, different profile configuration files 1604 can be defined for a given device profile template 1602 that each define a binding to a different backend service executing on one of the multiple different servers. These different profile configuration files 1604 allow the same device profile template 1602 to be dynamically connected to one of several different backend services on respective different servers based on the device or data source for which the device profile 906 will be used. Also, in some cases, some or all of the backend services or device binding definitions used to drive the profile 906 may reside and execute on the industrial device itself (e.g., communication protocol definitions, data formatting definitions, etc.). In such cases, the profile configuration file 1604 can define the backend service binding for the template 1602 as a binding to these device-level backend services.

While an instance of a device profile 906 is invoked in the development interface 1002 (see FIG. 10) by an end user of the IDE system 202, the user can submit device settings 908 to modify device information or configuration parameters of its corresponding physical device (e.g., by entering the edits in the appropriate data fields of the main device configuration area 1004 of the device profile's interface, as described above in connection with FIGS. 12-14c). When the device settings 908 are received at the IDE system 202, the project generation component 206 applies the edits settings 908 to the physical device corresponding to the profile 906. In the case of device configuration edits made during development of the system project 302 (without the IDE system 202 necessarily being communicatively connected to the industrial devices of the physical automation system), these edits may be applied solely to the device configuration information for the corresponding device stored in the system project 302, which will subsequently be downloaded to the corresponding device.

Figure 18:
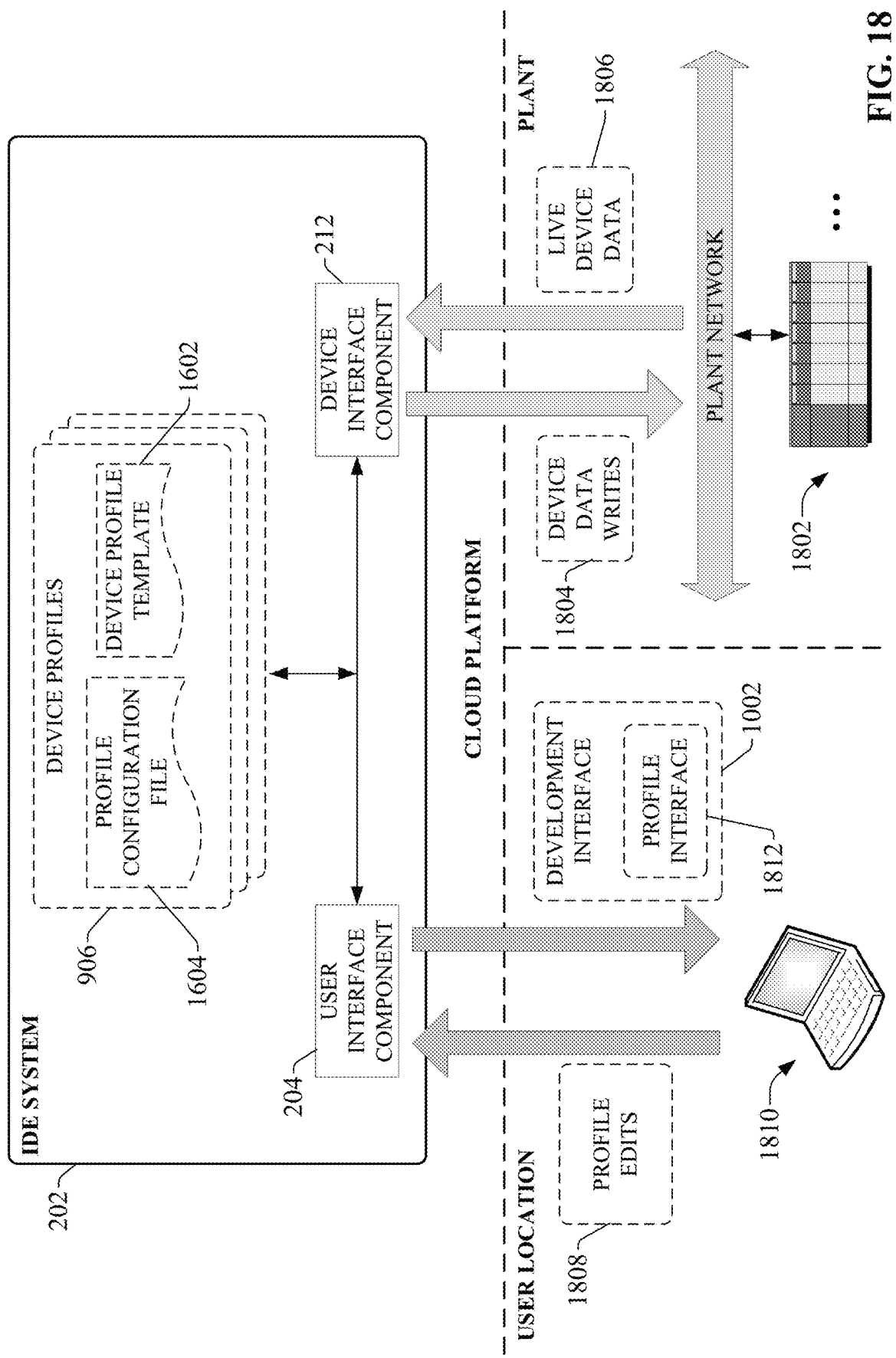
FIG. 18 is a diagram illustrating the use of the IDE system to remotely view and edit live data on industrial devices of an automation system.

In a runtime scenario in which the automation system has been commissioned and is currently operating in a plant facility, a web-based version of the IDE system 202 can allows the user to remotely connect to the physical devices of the automation system during operation, using the development interface 1002 as a frontend interface for viewing live status and operational data generated by the devices, as well as to view and edit device configuration parameters via the device profile interfaces. FIG. 18 is a diagram illustrating the use of IDE system 202 to remotely view and edit live data on industrial devices 1802 of an automation system (e.g., the automation system for which a system project 302 was developed). In this scenario, the web-based IDE system's user interface component 204 can serve a profile interface 1812—serving as a visualization of the device profile 906—to a client device 1810, and the system's device interface component 212 can establish a remote communication channel between the profile interface 1812 on the client device 1810 and a corresponding industrial device 1802 of an automation system operating within an industrial plant. This communication channel can traverse any public or private networks—including the internet and plant or office networks—necessary to establish a communication link between the client device 1810 and the physical device 1802.

As described above, each device profile 906 is defined by the device profile template 1602 referenced by the profile 906 and one or more profile configuration files 1604. The user can establish a communication channel to a selected device 1802 by invoking the device profile 906 corresponding to that device 1802 within the local instance of the IDE interface, which renders the profile interface 1812 for the selected profile 906 (e.g., the main configuration area 1004 and category window 1008) as defined by the device profile template 1602. The device profile 906 can be invoked via interaction with the navigation tree 1006 of a project's explorer panel 1012 (see FIG. 11). When the device profile 906 is invoked, the IDE system 202 creates and renders the profile view based on the template 1602 associated with the profile 906, and uses the binding information defined by the one or more profile configuration files 1604 associated with the profile 906 to connect the profile interface 1812 to the correct backend IDE services for the selected device 1802, as well as to bind the data fields of the profile interface 1812 to the correct data sources (e.g., data tags, data registers, smart object, etc.) on the device 1802. The device interface component 212 can then use the resulting communication channel to read live device data 1806 from the device 1802 and the user interface component 204 can render this data 1806 on the profile interface 1812, mapping each item of data 1806 to the appropriate data field of the profile interface 1812 in accordance with the profile configuration file 1604. The live device data 1806 can include current values of the device's configuration parameters, which are rendered in the corresponding data fields of the profile interface 1812 (e.g., the example data fields illustrated in FIGS. 12-14c). For some devices, the live device data 1806 may also include current status and operational data values, which can also be rendered on the profile interface 1812.

The remote communication channel established between the profile interface 1812 and its corresponding device 1802 also allows the user to submit, via interaction with the profile interface 1812, data edits 1808 to modify values of selected device parameters. When the data edits 1808 are received at the IDE system 202, the device interface component 212 sends the edits 1808 to the corresponding physical device 1802 as device data writes 1804. These device data writes 1804 modify the values of the device's configuration parameters in accordance with the edits 1808 remotely submitted by the user. Specifically, when the user submits an edit 1808 to a device configuration parameter (e.g., by modifying the parameter value in the corresponding data field of the profile interface 1812), the device interface component 212 writes the edit to the data tag or data register of the physical device 1802 identified by the profile configuration file 1604 as corresponding to the edited configuration parameter.

The approach for defining device profiles 906 described above effectively decouples the profile's view definition from the profile's services binding definitions by defining these two components separately using the reusable device profile templates 1602 (which defines the profile view) and profile configuration files 1604 (which define the services and device bindings). Although FIG. 18 depicts the templates 1602 and configuration files 1604 as residing on the same cloud-based system 202 during runtime, the templates 1602 and configuration files 1604 can also reside on separate machines in some implementations, with the system 202 dynamically linking the two during runtime when the corresponding profile 906 is invoked While the approach described above allows developers to adapt a reusable device profile template 1602 using a profile configuration file 1604 to set presentation features of a new device profile 906, some presentation features that are common across all profiles 906, and that are not tied to a specific device profile template 1602 or profile configuration file 1604, may be updated without the need to edit profile configuration files 1604 or the device profile template 1602. Such common features can include, but are not limited to, the color palette used for the profiles 906, shapes of certain components of the profile view, or other such features. Certain user interactions supported by the profiles 906—such as which keystrokes cause interactions with specified components or data fields of the profile view—can also be modified in a similar manner. Thus, some user experience features can be updated across multiple device profile views using means that do not involve editing the device profile template 1602 and profile configuration files 1604. These features of the profile views can be changed, for example, by updating the frontend application used to render the profile views.

Figure 19:
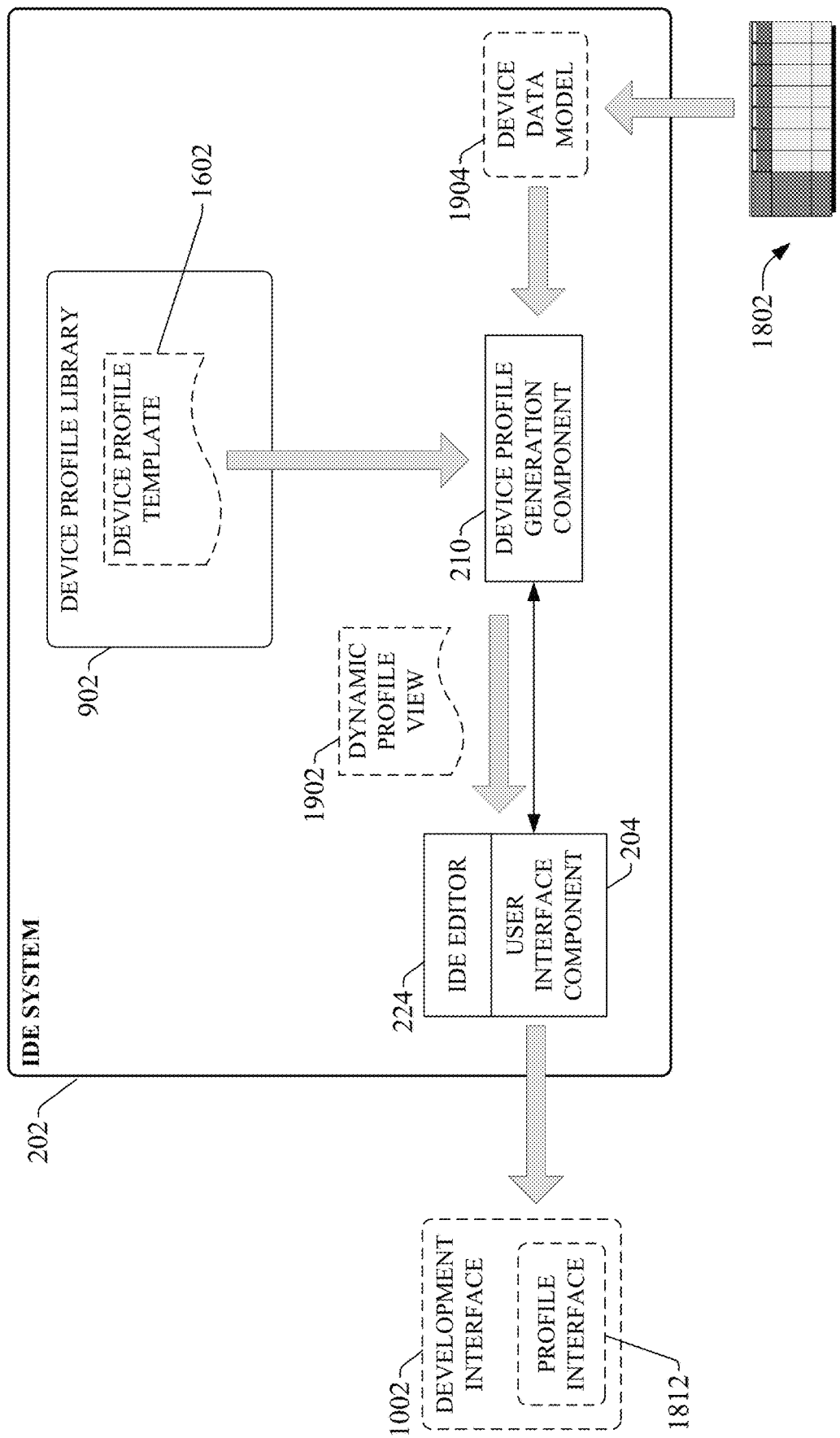
FIG. 19 is a diagram illustrating creation of dynamic device profile views based on a data model of an industrial device.

In the examples described above, the profile configuration file 1604 and the predefined device profile template 1602 together define a fixed device profile view for a given device or device type, rendered as the profile interface 1812 for the device profile 906. To further reduce the amount of development time and effort required to define presentation views for device profiles 906, some embodiments of the device profile generation component 210 can be configured to generate dynamic device profile views for a given industrial device based on a data model for the device. FIG. 19 is a diagram illustrating creation of dynamic device profile views based on a data model 1904 of an industrial device 1802. In this example, a single file or set of files—e.g., a device profile template 1602 in the illustrated example—are created that define a device profile view in terms of the visual and control components that make up the view (e.g., data fields, alphanumeric labels for the data fields, navigation controls, etc.), the locations and orientations of these components, color schemes, navigation structures or schemas for navigating different views or screens of the device profile interface, and other such properties of the device profile view.

The presentation view defined by the device profile template 1602 may be suitable, with variations, for multiple different types of devices that support respective different capabilities or that have different sets of available data. So that the same device profile template 1602 can be used for multiple types of devices 1802 having different capabilities and available data, the device profile generation component 210 can be configured to analyze a device data model 1904 representing an industrial device 1802 for which a dynamic profile view 1902 is to be generated, and adapt the profile view defined by the device profile template 1602 based on the contents of the data model 1904. The device data model 1904 can define, for its corresponding device 1802 or device type, data items available on the device 1802 (e.g., specific items of operational, status, or diagnostic data available on the device), features or functions supported by the device 1802 (e.g., networking capabilities, operating modes, available inputs and outputs, data ports included on the industrial device, etc.), or other properties of the device that can be leveraged by the IDE system 202 to generate a suitable dynamic profile view for the devices 1802, which is then rendered within the development interface 1002 as the profile interface 1812 for that device 1802.

In some scenarios, the data model 1904 for a given device 1802 can be developed and submitted to the IDE system 202 by a vendor of the device 1802 for storage in a library of device data models 1904 available to the IDE system 202. In other scenarios, the data model 1904 can be received at the IDE system 202 from the device 1802 itself (e.g., via the device interface component 212). For example, in the cloud-based versions of the IDE system 202 depicted in FIG. 18, the device interface component 212 can poll industrial devices 1802 that are deployed at an industrial facility for device data models 1904 that may be installed on those devices 1802 (via any public or private intermediate networks). The device interface component 212 can retrieve a discovered data model 1904 from a device 1802 and provide the model 1904 to the device profile generation component 210, which uses the information contained in the data model 1904 to create a suitable dynamic profile view 1902—rendered as profile interface 1812—for the device 1802 by adapting the view properties defined by the device profile template 1602 based on the model 1904.

According to an example technique, a device profile template 1602 can define all view properties (e.g., data fields, alphanumeric text, profile screen navigation structures or schemas, etc.) that may be necessary to generate device profile interfaces 1812 for a range of different devices 1802, including properties corresponding to data or features that may be supported by a first subset of the devices 1802 but that are not supported by a second subset of the devices 1802. When generating a dynamic profile view 1902 for a device 1802, the device profile generation component 210 can identify the available data and supported features recorded in the device's data model 1904 and generate the dynamic profile view 1902 to include only the presentation features defined by the profile template 1602 that correspond to the data and features identified in the data model 1904, while omitting from the dynamic profile view 1902 any view properties defined by the template 1602 that correspond to data or features that are not identified by the data model 1904.

For example, the device profile template 1602 may define, as one of multiple defined profile interface displays, a control and information protocol (CIP) network configuration display designed to render a device's CIP networking parameters (e.g., CIP address, baud rate, etc.), as well as a navigation control for navigating to this CIP network configuration display (e.g., a control in the category window 1008; see FIG. 10). If the device data model 1904 for a device 1802 being invoked by the user within the development interface 1002 indicates that the device 1802 supports CIP networking, the device profile generation component 210 will generate the dynamic profile view 1902 to include this CIP network configuration display and its navigation control. Alternatively, if the data model 1904 does not indicate that the device 1802 supports CIP networking, the device profile generation component 210 will omit the CIP network configuration display and its navigation control from the dynamic profile view 1902.

In some embodiments, different device profile templates 1602 can be created that correspond to respective different classes of devices. When a user invokes a device 1802 within the development interface 1002 to view or edit the device's configuration parameters, the device profile generation component 210 can first select, as a base template, the device profile template 1602 corresponding to the device class to which the device belongs (e.g., industrial controllers, I/O modules, motor drives, etc.). This class-specific device profile template 1602 can define all view properties that may be relevant to the corresponding device class. For example, a device profile template 1602 specific to I/O modules may define profile interface displays and associated data fields for digital inputs, digital outputs, analog inputs, analog outputs, 8-point modules, 16-point modules, or other such I/O module features. When a specific I/O module is invoked by the user, the device profile generation component 210 can identify, based on the module' data model 1904, the specifications of the I/O module (e.g., 8-point digital input, 16-point analog output, whether the module supports 0-10 V analog signals or 4-20 mA analog signals, etc.), and generate the dynamic profile view 1902 to include only the profile interface features defined in the device profile template 1602 corresponding to the specifications of the I/O module.

In addition to generating the dynamic profile view 1902 for a selected device 1802 based on the device profile template and the device data model 1904 for the device 1802, the device profile generation component 210 can also establish appropriate device and backend service bindings for the resulting profile interface 1812. In some embodiments, the backend service bindings can be defined by the profile template 1802 and, for class-specific templates 1602, may be a function of the class of devices for which the template 1602 was created. The device service bindings may be determined based on the device data model 1904 in some cases, or may be predefined by the device profile template 1602.

In some embodiments, rather than generating the dynamic profile view 1902 based on a device data model 1904 for a device, the device profile generation component 210 can infer which features defined in the device profile template 1602 are to be included in the dynamic profile view 1902 based on the actual device data 1806 received from the device 1802 (see FIG. 18). In this regard, the device profile generation component 210 can learn the data items that are available on the device 1802 (e.g., specific items of operational data, status information, configuration parameters, etc.) based on the live data 1806 read from the device 1802, identify which profile interface features defined in the device profile template 1602 correspond to these data items, and generate the dynamic profile view 1902 to include only these interface view features while omitting features that doe not correspond to the received data items.

Figure 20:
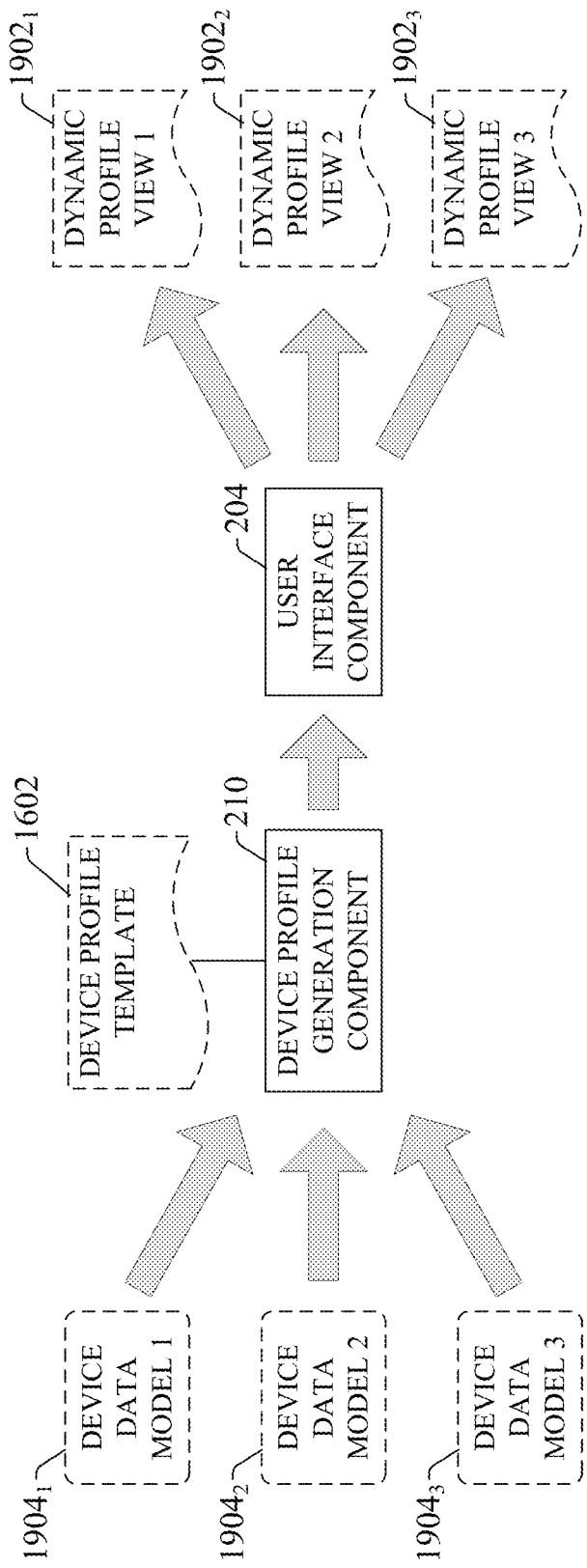
FIG. 20 is a diagram illustrating the use of a single device profile template to create dynamic profile views for multiple different devices.

This approach for generating dynamic device profile views allows a relatively small number of device profile templates 1602 to be used to create device profiles—and corresponding profile interfaces 1812—for a larger number of industrial devices 1802. FIG. 20 is a diagram illustrating the use of a single device profile template 1602 to create dynamic profile views for multiple different devices. Using the approach described above, a single device profile template 1602—which may be a class-specific template 1602 defining a full range of profile interface features (e.g., data fields, alphanumeric text labels, interface screen layouts, screen navigation structures, etc.) that may be relevant to industrial devices 1802 belonging to a class of devices—can be leveraged by the device profile generation component 210 to generate multiple different dynamic profile views 1902 for respective different industrial devices 1802 based on the device data models 1904 representing those devices 1802 (or based on the live device data obtained form the devices 1802). Thus, only a single code base is required for a range of devices 1802, and the code base is adapted for a specific device 1802 based on data about, or from, the device 1802. This approach mitigates the need for profile developers to create a new device profile 906 for each new device 1802 that becomes available on the market. In some embodiments, the device profile template 1602 can be a preformatted text file that can be easily edited by profile developers without specialized programming expertise.

The approaches described herein for creating new device profiles 906 or dynamic profile views 1902 can reduce the amount of time and effort spent developing device profiles 906 for an industrial IDE system by allowing predefined profile views to be easily reused and adapted for use with different industrial devices. Since the profiles 906 are adapted using text-based configuration files 1604 that can be easily edited to define bindings between the predefined profile view and device-specific backend IDE services, as well as bindings between the profile view and the physical device data, profile developers need not have specialized coding expertise to create new device profiles 906.

Figure 21:
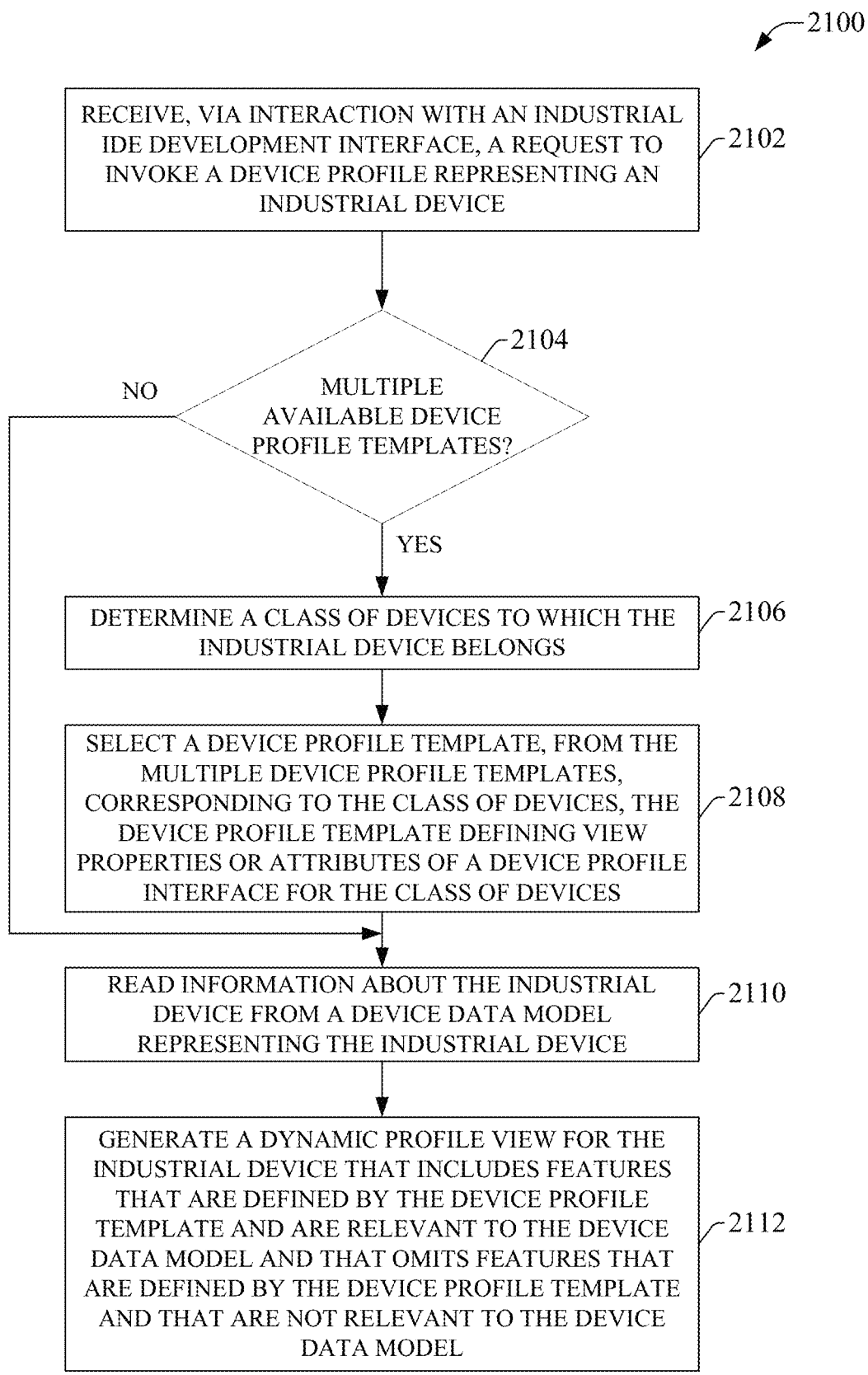
FIG. 21 is a flowchart of an example methodology for generating a dynamic device profile view or interface for an industrial device within the context of an industrial IDE development interface.

FIG. 21 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 21 illustrates an example methodology 2100 for generating a dynamic device profile view or interface for an industrial device within the context of an industrial IDE development interface. Initially, at 2102, a request to invoke a device profile representing an industrial device is received via interaction with an industrial IDE development interface. At 2104, a determination is made as to whether multiple device profile templates are available for rendering device profiles via the industrial IDE system. In an example implementation, the industrial IDE system may store multiple device profile templates for respective different classes of industrial devices (e.g., industrial controllers, motor drives, I/O modules, etc.). If multiple device profile templates are available (YES at step 2104), the methodology proceeds to step 2106, where a class of devices to which the requested industrial device belongs is determined. At step 2108, a device profile template is selected, from among the multiple device profile templates, that corresponds to the class of devices to which the industrial device belongs. The device profile template defines view properties or attributes of a device profile interface for the class of devices represented by the template, including graphical components (e.g., data fields, alphanumeric text, etc.), the arrangements of these components on one or more interface displays, navigation structures and controls for navigating the one or more interface displays, etc. The template may include a range of different view properties that are relevant to some industrial devices belonging to the class of devices while not being required for other devices within the class, such that the template 1602 defines a full set of device profile view properties from which a device profile interface can be built for any device within the class.

When the device profile template has been selected at step 2108 (or if there is only one device profile template; NO at step 2104), the methodology proceeds to step 2110, where information about the selected industrial device is read from a device data model representing the industrial device. The device data model can identify, for example, data items that are available from the industrial device (e.g., items of operations, status, and diagnostic data), functions supported by the industrial device (e.g., networking capabilities, operating modes, available inputs and outputs, data ports included on the industrial device), or other such information.

At 2112, based on the device profile template and the device data model, a dynamic profile view for the industrial device is generated that includes features that are defined by the device profile template and that are relevant to the device data model, and that omits features that are defined by the device profile template and that are not relevant to the device data model. In general, the IDE system creates the dynamic device profile view using a selected subset of presentation components defined by the device profile template that correspond to data items and features defined in the device data model. The dynamic profile view is then rendered within the industrial IDE development interface and used to display information and configuration parameter values for the corresponding device, and to facilitate editing of the configuration parameter values.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the Internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 22:
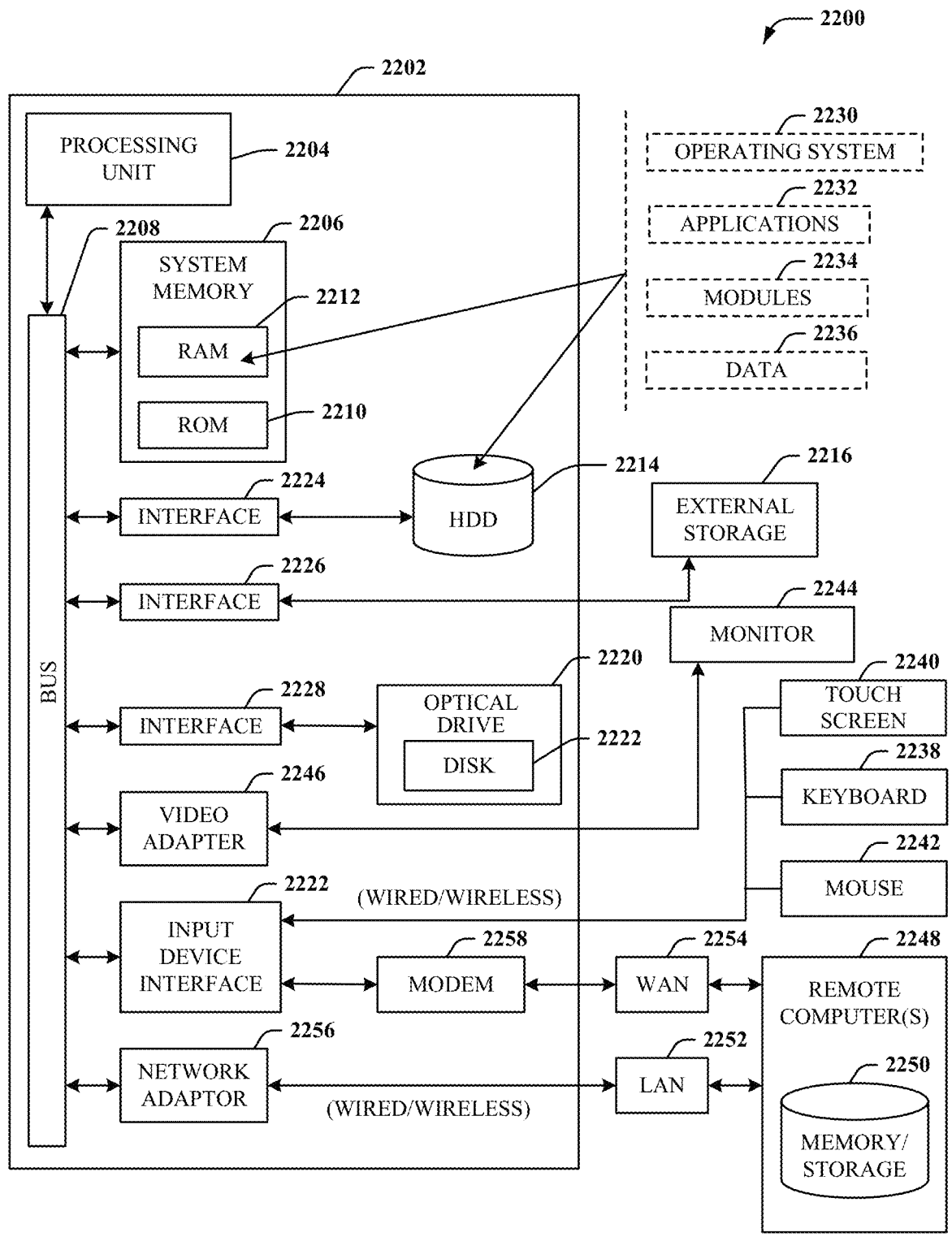
FIG. 22 is an example computing environment.
Figure 23:
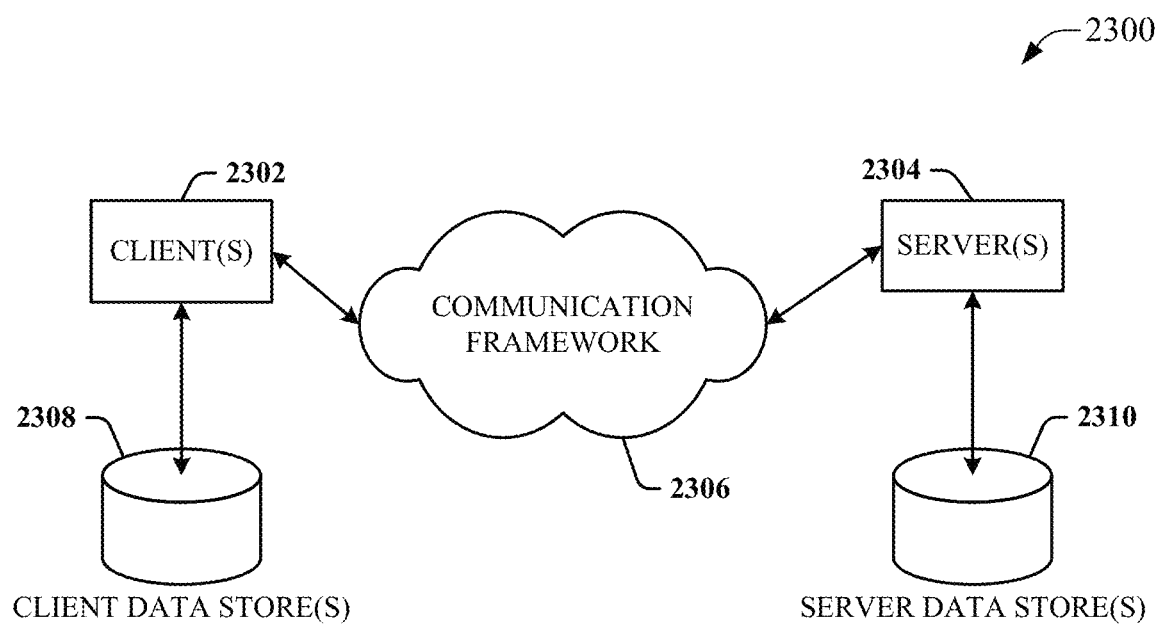
FIG. 23 is an example networking environment.

In order to provide a context for the various aspects of the disclosed subject matter, FIGS. 22 and 23 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for application programs 2232. Runtime environments are consistent execution environments that allow application programs 2232 to run on any operating system that includes the runtime environment. Similarly, operating system 2230 can support containers, and application programs 2232 can be in the form of containers, which are lightweight, standalone, executable packages of software that include, e.g., code, runtime, system tools, system libraries and settings for an application.

Further, computer 2202 can be enable with a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2244 or other type of display device can be also connected to the system bus 2208 via an interface, such as a video adapter 2246. In addition to the monitor 2244, a computer typically includes other peripheral output devices (not shown), such as speakers, printers, etc.

The computer 2202 can operate in a networked environment using logical connections via wired and/or wireless communications to one or more remote computers, such as a remote computer(s) 2248. The remote computer(s) 2248 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2250 is illustrated. The logical connections depicted include wired/wireless connectivity to a local area network (LAN) 2252 and/or larger networks, e.g., a wide area network (WAN) 2254. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2252 through a wired and/or wireless communication network interface or adapter 2256. The adapter 2256 can facilitate wired or wireless communication to the LAN 2252, which can also include a wireless access point (AP) disposed thereon for communicating with the adapter 2256 in a wireless mode.

When used in a WAN networking environment, the computer 2202 can include a modem 2258 or can be connected to a communications server on the WAN 2254 via other means for establishing communications over the WAN 2254, such as by way of the Internet. The modem 2258, which can be internal or external and a wired or wireless device, can be connected to the system bus 2208 via the input device interface 2222. In a networked environment, program modules depicted relative to the computer 2202 or portions thereof, can be stored in the remote memory/storage device 2250. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2252 or WAN 2254 e.g., by the adapter 2256 or modem 2258, respectively. Upon connecting the computer 2202 to an associated cloud storage system, the external storage interface 2226 can, with the aid of the adapter 2256 and/or modem 2258, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 23 is a schematic block diagram of a sample computing environment 2300 with which the disclosed subject matter can interact. The sample computing environment 2300 includes one or more client(s) 2302. The client(s) 2302 can be hardware and/or software (e.g., threads, processes, computing devices). The sample computing environment 2300 also includes one or more server(s) 2304. The server(s) 2304 can also be hardware and/or software (e.g., threads, processes, computing devices). The servers 2304 can house threads to perform transformations by employing one or more embodiments as described herein, for example. One possible communication between a client 2302 and servers 2304 can be in the form of a data packet adapted to be transmitted between two or more computer processes. The sample computing environment 2300 includes a communication framework 2306 that can be employed to facilitate communications between the client(s) 2802 and the server(s) 2304. The client(s) 2802 are operably connected to one or more client data store(s) 2308 that can be employed to store information local to the client(s) 2802. Similarly, the server(s) 2304 are operably connected to one or more server data store(s) 2310 that can be employed to store information local to the servers 2304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering tech-

What is claimed is:

1. A system, comprising:
   a memory that stores executable components; and
   a processor, operatively coupled to the memory, that executes the executable components, the executable components comprising:
   a user interface component configured to:
   render, on a client device, a development interface of an industrial integrated development environment (IDE) system, and
   display, on the development interface, design information relating to an industrial control project of an industrial automation system, the design information comprising at least device profiles representing physical industrial devices included in the industrial automation system; and
   a device profile generation component configured to, in response to selection, via interaction with the development interface, of a device profile corresponding to an industrial device:
   select a device profile template to be used as a basis for rendering a profile interface for the device profile, wherein the device profile template defines presentation features of the profile interface,
   identify a first subset of the presentation features defined by the device profile template that correspond to features of the industrial device defined in a device data model, and
   generate, on the development interface, the profile interface to include the first subset of the presentation features and to omit a second subset of the presentation features that do not correspond to the features of the industrial device defined in the device data model.

2. The system of claim 1, wherein the presentation features defined by the profile interface comprise at least one of data fields to be rendered on the profile interface, alphanumeric text to be rendered on the profile interface, locations and orientations of at least one of the data fields or the alphanumeric text, a navigation schema for navigating different views of the profile interface, or navigation controls for navigating the different views.

3. The system of claim 1, wherein the device profile generation component is configured to select the device profile template from a library of device profile templates that are associated with respective classes of industrial devices.

4. The system of claim 3, wherein the classes of industrial devices comprise at least one of industrial controllers, I/O modules for industrial controllers, or motor drives.

5. The system of claim 1, wherein the features of the industrial device defined in the device data model comprise at least one of items of operational, status, or diagnostic data available on the industrial device; a networking protocol supported by the industrial device; a data port included on the industrial device; or an operating mode supported by the industrial device.

6. The system of claim 1, wherein the profile interface is configured to display device configuration data for the industrial device and receive edits to the device configuration data.

7. The system of claim 6, wherein the device configuration data comprises at least one of a network setting, a communication setting, a scale factor, an input or output signal type, an operating mode setting, a tuning parameter value, a maximum or minimum value, a refresh rate, or a channel configuration.

8. The system of claim 1, wherein the device profile template is a text-based file.

9. The system of claim 1, wherein
   the device profile template is used as a basis for device profiles for multiple industrial devices, and
   the device profile generation component adapts the device profile template to yield the device profiles based on device data models respectively representing the multiple industrial devices.

10. A method, comprising:
    rendering, by an industrial integrated development environment (IDE) system comprising a processor, a development interface on a client device;
    displaying, by the industrial IDE system on the development interface, design information relating to an industrial control project of an industrial automation system, the design information comprising at least device profiles representing physical industrial devices included in the industrial automation system; and
    in response to receiving a selection, via interaction with the development interface, of a device profile corresponding to an industrial device:
    selecting, by the industrial IDE system, a device profile template to be used as a basis for rendering a profile interface for the device profile, wherein the device profile template defines presentation features of the profile interface,
    identifying, by the industrial IDE system, a first subset of the presentation features defined by the device profile template that correspond to features of the industrial device defined in a device data model, and
    generating, by the industrial IDE system, the profile interface on the development interface, wherein the generating comprises rendering, on the profile interface, the first subset of the presentation features and omitting, from the profile interface, a second subset of the presentation features that do not correspond to the features of the industrial device defined in the device data model.

11. The method of claim 10, wherein the presentation features defined by the profile interface comprise at least one of data fields to be rendered on the profile interface, alphanumeric text to be rendered on the profile interface, locations and orientations of at least one of the data fields or the alphanumeric text, a navigation structure for navigating different views of the profile interface, or navigation controls for navigating the different views.

12. The method of claim 10, wherein the selecting comprises selecting the device profile template from a library of device profile templates that are associated with respective classes of industrial devices.

13. The method of claim 12, wherein the classes of industrial devices comprise at least one of industrial controllers, I/O modules for industrial controllers, or motor drives.

14. The method of claim 10, wherein the device data model defines, as the features of the industrial device, at least one of items of operational, status, or diagnostic data available on the industrial device; a networking protocol supported by the industrial device; a data port included on the industrial device; or an operating mode supported by the industrial device.

15. The method of claim 10, further comprising displaying, by the industrial IDE system on the profile interface, display device configuration data for the industrial device.

16. The method of claim 15, wherein the device configuration data comprises at least one of a network setting, a communication setting, a scale factor, an input or output signal type, an operating mode setting, a tuning parameter value, a maximum or minimum value, a refresh rate, or a channel configuration.

17. The method of claim 10, wherein the device profile template is a text-based file.

18. A non-transitory computer-readable medium having stored thereon instructions that, in response to execution, cause an industrial integrated development environment (IDE) system comprising a processor to perform operations, the operations comprising:
displaying a development interface on a client device;
displaying, on the development interface, an industrial control project developed for an industrial automation system, the industrial control project comprising at least device profiles representing industrial devices included in the industrial automation system; and
in response to receiving a selection, via interaction with the development interface, of a device profile corresponding to an industrial device:
selecting a device profile template to be used for rendering a profile interface for the device profile, wherein the device profile template defines user interface features of the profile interface,
referencing a device data model that defines data items and features supported by the industrial device;
identifying a first subset of the user interface features defined by the device profile template that correspond to the data items and features defined in the device data model, and
displaying the profile interface on the development interface, wherein the displaying comprises displaying, on the profile interface, the first subset of the presentation features and omitting, from the profile interface, a second subset of the presentation features that do not correspond to the data items and features defined in the device data model.

19. The non-transitory computer-readable medium of claim 18, wherein the presentation features defined by the profile interface comprise at least one of data fields to be rendered on the profile interface, alphanumeric text to be rendered on the profile interface, locations and orientations of at least one of the data fields or the alphanumeric text, a navigation structure for navigating different views of the profile interface, or navigation controls for navigating the different views.

20. The non-transitory computer-readable medium of claim 18, wherein the selecting comprises selecting the device profile template from a library of device profile templates that are associated with respective classes of industrial devices.

\* \* \* \* \*